(12) United States Patent
Slabber et al.

(10) Patent No.: US 12,525,146 B2
(45) Date of Patent: Jan. 13, 2026

(54) SIMULATED EYE SURGICAL TRAINING TOOL

(71) Applicants: Nico J. Slabber, Eastvale, CA (US); Nathaniel R. Collins, Monrovia, CA (US); Vijay R. Balan, Torrance, CA (US)

(72) Inventors: Nico J. Slabber, Eastvale, CA (US); Nathaniel R. Collins, Monrovia, CA (US); Vijay R. Balan, Torrance, CA (US)

( * ) Notice: Subject to any disclaimer, the term of this patent is extended or adjusted under 35 U.S.C. 154(b) by 574 days.

(21) Appl. No.: 18/094,821

(22) Filed: Jan. 9, 2023

(65) Prior Publication Data

US 2023/0237932 A1 Jul. 27, 2023

Related U.S. Application Data

(63) Continuation-in-part of application No. 17/676,716, filed on Feb. 21, 2022, now Pat. No. 11,551,582.

(60) Provisional application No. 63/227,490, filed on Jul. 30, 2021, provisional application No. 63/188,089, filed on May 13, 2021, provisional application No. 63/151,902, filed on Feb. 22, 2021.

(51) Int. Cl.
*G09B 23/30* (2006.01)
*G09B 5/02* (2006.01)

(52) U.S. Cl.
CPC ............... *G09B 23/30* (2013.01); *G09B 5/02* (2013.01)

(58) Field of Classification Search
None
See application file for complete search history.

(56) References Cited

U.S. PATENT DOCUMENTS

| | | |
|---|---|---|
| 3,177,593 A | 4/1965 | Loeb |
| 4,865,552 A | 9/1989 | Maloney |

(Continued)

FOREIGN PATENT DOCUMENTS

WO WO2021055751 A1 3/2021

OTHER PUBLICATIONS

SimulEYE®iStent-inject-W, Product advertisement, https://www.simuleye.com/products/simuleye-istent-inject—downloaded May 9, 2021.

(Continued)

*Primary Examiner* — James B Hull
(74) *Attorney, Agent, or Firm* — Guy Cumberbatch

(57) ABSTRACT

A simulated eye surgical training tool, namely an eye model that facilitates training of ophthalmic surgical procedures, such as goniotomy and trabecular meshwork manipulation. The eye model includes a core made of a rigid material and a Canal frame disposed at an upper end of the core that defines an inwardly-facing Schlemm's canal groove in an inner wall thereof. Various structures may be used in or across the Schlemm's canal groove to simulate a trabecular meshwork. For instance, a flexible sheet may span across the groove, or a soft material placed in the groove. Color or opacity may be used to distinguish the groove from surrounding structures. Also, a corneal dome having an upper hemispherical portion is mounted over the Canal frame, and a scleral dome having an upper bore is mounted around the corneal dome. The core may be mounted on one of a number of angled pedestals on a base.

20 Claims, 35 Drawing Sheets

(56) References Cited

U.S. PATENT DOCUMENTS

| | | | |
|---|---|---|---|
| 6,589,057 B1 * | 7/2003 | Keenan | G09B 23/30 |
| | | | 434/271 |
| 7,066,598 B2 * | 6/2006 | Niven | G09B 23/30 |
| | | | 351/203 |
| 8,128,412 B2 | 3/2012 | Carda | |
| 8,137,111 B2 | 3/2012 | Carda | |
| 8,235,728 B2 | 8/2012 | Stoll | |
| 8,308,487 B2 | 11/2012 | Van Dalen | |
| 8,684,743 B2 | 4/2014 | Van Dalen | |
| 8,845,334 B1 | 9/2014 | Stoll | |
| 9,336,692 B1 | 5/2016 | Stoll | |
| 9,384,681 B2 | 7/2016 | Van Dalen | |
| D766,369 S | 9/2016 | Van Dalen | |
| 9,437,119 B1 | 9/2016 | Bernal | |
| 10,290,236 B2 | 5/2019 | Bernal | |
| 10,360,815 B2 | 7/2019 | Bernal | |
| 10,636,325 B2 | 4/2020 | Bernal | |
| 2009/0291423 A1 | 11/2009 | Hara | |
| 2014/0356836 A1 * | 12/2014 | Van Dalen | G09B 23/286 |
| | | | 434/271 |
| 2020/0118466 A1 | 4/2020 | Bernal | |
| 2020/0135056 A1 | 4/2020 | Omata | |
| 2021/0205126 A1 | 7/2021 | Puglisi | |

OTHER PUBLICATIONS

Understanding Trabecular Meshwork Physiology: A Key to the Control of Intraocular Pressure?—Llobet, et al., News Physiol Sci 18: 205-209, 2003.

* cited by examiner

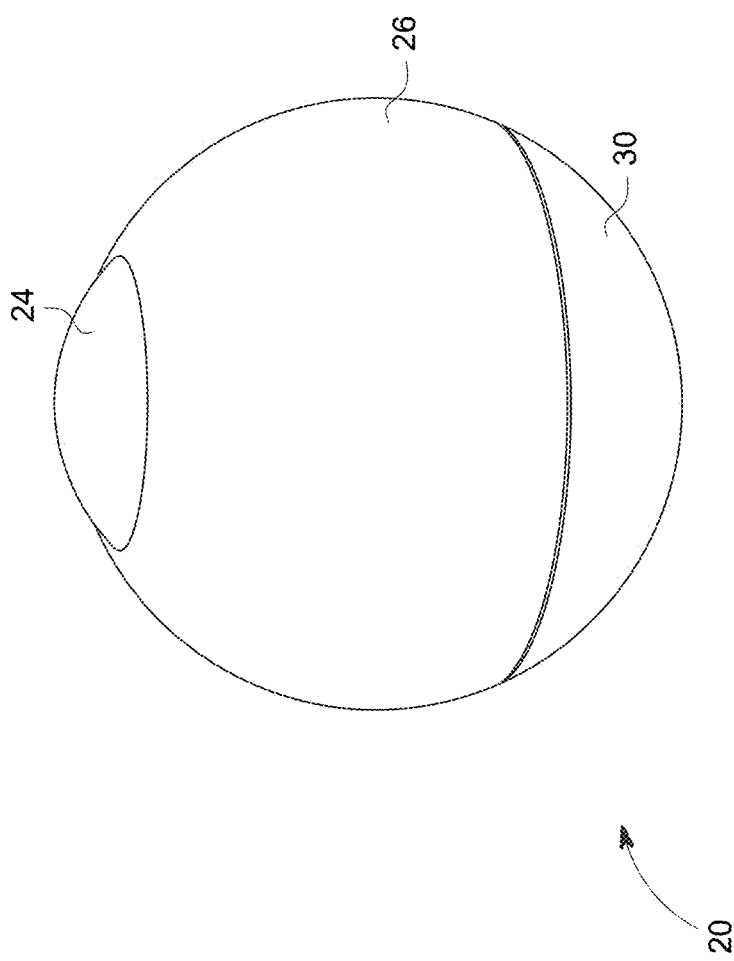

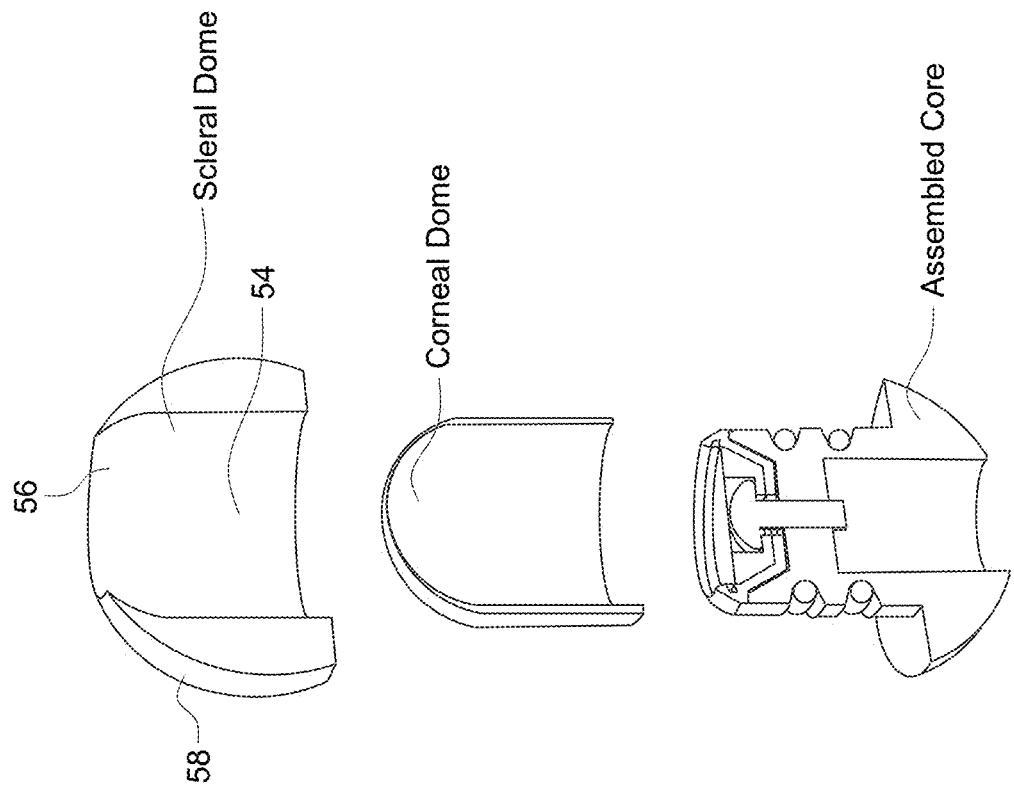
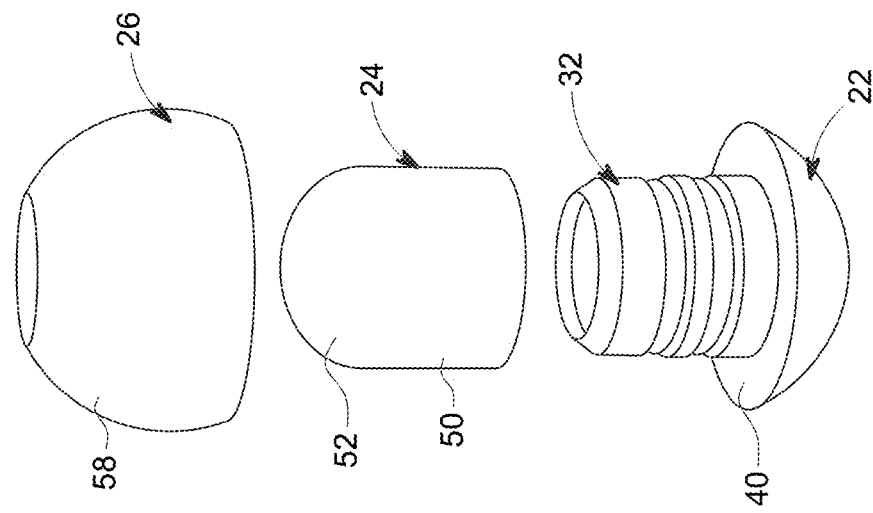

SIMULATED EYE SURGICAL TRAINING TOOL

RELATED APPLICATIONS

The present application is a continuation-in-part of U.S. Ser. No. 17/676,716, filed Feb. 21, 2022, which claims priority to prior U.S. provisional Ser. Nos. 63/227,490, filed Jul. 30, 2021, U.S. provisional Ser. Nos. 63/188,089, filed May 13, 2021, and Ser. No. 63/151,902, filed Feb. 22, 2021, the contents of which are expressly incorporated herein.

FIELD OF THE INVENTION

The present application is directed to a simulated eye surgical training tool and, in particular, to an eye model that facilitates training of ophthalmic surgery procedures, such as goniotomy and trabecular meshwork (TM) manipulation.

BACKGROUND OF THE INVENTION

Glaucoma is a blinding optic neuropathy affecting approximately 70 million individuals worldwide. Its main risk factor is elevated intraocular pressure (TOP). The trabecular meshwork (TM), a group of tiny canals located in the iridocorneal angle, constitutes the main pathway for drainage of aqueous humor out of the eye. It is a fenestrated three-dimensional structure composed of trabecular meshwork cells (TMC) within a multi-layered extracellular matrix (ECM). The trabecular meshwork controls the IOP by regulating outflow of aqueous humor from the anterior chamber of the eye into the adjacent Schlemm's canal (SC) and then via aqueous vein collector channels into the venous system. Dysfunction of the trabecular meshwork is one major cause of IOP elevation.

Goniotomy is a surgical procedure in which the doctor uses a lens called a goniolens to see the structures of the front part of the eye (anterior chamber). An opening is made in the TM where fluid leaves the eye. The new opening provides a way for fluid to flow out of the eye. Some other procedures that create a new opening for fluid flow through the TM include laser and stents.

Medical students, interns, residents, and fellows, specializing in diagnosing and treating injuries to, and the diseases of, the eye must necessarily practice certain surgical techniques prior to actually operating on human patients. Many surgical techniques require dexterous movement and control by the surgeon. This dexterity cannot be developed by reading textbooks or watching instructional videos. Animal models or cadavers have been the default method for hands-on surgical training.

The use of human cadaver and/or animal eyes (collectively "biological eyes") is burdened with many procedural issues. The biological eyes must be refrigerated before use, and even when refrigerated suffer from a short "shelf life" due to inevitable biological decomposition. The handling of such biological eyes requires compliance with, among other regulations, the Blood Born Pathogens Standard promulgated under the federal Occupational Health and Safety Act. After use, the biological eyes must be properly disposed of.

In the field of ophthalmic surgery, there are a number of examples of artificial models for eye surgery. Examples of synthetic eye models may be seen in U.S. Pat. Nos. 8,128,412, 8,235,728 and 9,437,119, to list just a few.

What is needed is a model human eye that closely mimics the anatomy and physiology of the human eye for particular procedures.

SUMMARY OF THE INVENTION

This application presents a simulated eye training tool, used to practice ophthalmic surgeries to treat glaucoma, cataracts and/or other non-glaucoma procedures.

A first embodiment of an eye model for ophthalmic training procedures comprises a lower core made of a rigid material, and a Canal frame disposed at an upper end of the core that defines a circular upper lip and an inwardly-facing circular Schlemm's canal groove formed in an inner wall of the Canal frame below the upper lip. A flexible sheet spans across the Schlemm's canal groove and simulates a trabecular meshwork. A compressible corneal dome having an upper hemispherical portion mounts over the Canal frame upper lip, and a scleral dome mounts around the corneal dome and has an upper bore that fits closely around the hemispherical portion of the corneal dome.

The eye model may further include a base adapted to provide a platform for the eye model and multiple pedestals extending upward from the base at different angles, the base and pedestals being made of a rigid material, wherein the core is configured to attach at the top of any of the pedestals. A lower end of the core may receive an insert having an inner recess, and each of the pedestals has a post with attachment structure configured to mate with the inner recess selected from the group consisting of threads, a magnet and a snap-on shape.

A second embodiment of an eye model may comprise a lower core made of a rigid material and having a lower cavity, and a Canal frame disposed at an upper end of the core that defines a circular upper lip and an inwardly-facing circular Schlemm's canal groove formed in an inner wall of the Canal frame below the upper lip. Structure simulating a trabecular meshwork is placed over or within the canal groove. The eye model also has a compressible corneal dome having an upper hemispherical portion mounted over the Canal frame upper lip, and a scleral dome mounted around the corneal dome and having an upper bore that fits closely around the hemispherical portion of the corneal dome. Finally, a base adapted to provide a platform for the eye model and multiple pedestals extending upward from the base at different angles, the base and pedestals being made of a rigid material, and wherein the lower cavity of the core is configured to attach at the top of any of the pedestals.

The Canal frame in either the first or second embodiments may be formed by an upper end of the core. An outer portion of the flexible sheet may extend outward around the upper lip and an inner portion conforms to a central depression defined by the Canal frame and circumscribed by the upper lip. A sheet clamp shaped to match the depression and secured to the Canal frame sandwiches the inner portion of the flexible sheet therebetween. The outer portion of the flexible sheet may extend down outside of the Canal frame and have an outer skirt section secured to the lower core by at least one anchor.

The eye models may further include an iris/pupil graphic visible on an upper surface of the sheet clamp. The iris/pupil graphic may include a graphical representation of the iris and pupil as well as a circular array of hash marks spaced to simulate hours of a clock face.

The flexible sheet may be clear while, the Schlemm's canal groove is colored a different color than surrounding portions of the inner wall. The flexible sheet may be colored or opaque.

In one embodiment, the eye training tool may comprise:

A base to hold the eye in place during the simulated surgery that has one or more fixed angled pedestals with pedestal angles ranging from 0-45 degrees. The base may be made of a rigid material (e.g., hard plastic, metal, etc.), and the pedestal angle may be fixed or adjustable.

The eye training tool consists of 5 features at minimum: Core, Scleral Dome, Corneal Dome, Canal Frame, and Synthetic TM (trabecular meshwork).

For TM piercing procedures the eye training tool consists of 7 features: Core, Scleral Dome, Corneal Dome, Canal Frame, Synthetic TM (Sheet/Tube), Sheet Anchoring, and an Iris/Pupil Graphic.

For TM excision procedures the eye training tool consists of 6 features: Core, Scleral Dome, Corneal Dome, Canal Frame, Synthetic TM (Excisable), and an Iris/Pupil Graphic.

The Core anchors other parts of the eye which are manipulated during simulated surgery and mechanically attaches onto a pedestal to secure it place.

The Scleral Dome (outermost part of the eye), representing the sclera and conjunctiva, can either be rigid for ab interno approaches or soft and pierceable for ab externo approaches. The scleral dome can also be formed with layers for dissection.

The Corneal Dome may be transparent, pierceable, and behaves similarly to actual corneal tissue.

The Canal Frame contains Schlemm's canal and can be rigid for approaches that do not need to manipulate Schlemm's canal or pierceable for approaches that do. The back wall(s) of Schlemm's canal may be colored to aid in visual identification of the structure.

The Synthetic TM can be represented by various components depending on the surgery being simulated. For procedures that require instruments to pierce or pass through the TM (e.g., canaloplasty) it may be represented by a sheet/film/wrap stretched over Schlemm's canal and mechanically fixated. This sheet/film/wrap can be transparent or opaque. An alternative to sheet/film/wrap over the canal is a tube placed inside the canal. For procedures that excise the TM (e.g., goniotomy) the TM may be represented by a modeling compound/gel/agar type material that can be removed in sections.

An Iris/Pupil Graphic can sit in the center of the eye to give a graphical representation of the iris and pupil. This is cosmetic only.

The combination of the eye components creates a watertight simulated anterior chamber to contain viscoelastic type fluids used in surgery.

One need in the art is a model human eye that closely mimics the anatomy and physiology of the human eye for particular procedures.

A perfect eye with all anatomical features present and functional should not be built. The level of difficulty required is too high for too little payoff. (Example: A functional retina does not help with TM manipulation surgery.) Therefore, anatomical features that are not involved in the procedure do not need to be represented unless doing so makes the design easier.

Multiple features are used to achieve different purposes. Rigid components provide necessary stability for the manipulation of other flexible features which provide proper anatomical material properties like flexibility and pierceability.

Various training methods for ophthalmic procedures are disclosed, including providing any of the eye models described herein, inserting a surgical instrument through the simulated cornea and practicing an ophthalmic procedure. The training method may involve manipulation of the trabecular meshwork. Or the training method may include inserting a surgical instrument through the simulated cornea and practicing an ophthalmic procedure.

BRIEF DESCRIPTION OF THE DRAWINGS

Features and advantages of the present invention will become appreciated as the same become better understood with reference to the specification, claims, and appended drawings wherein:

FIG. 1A is an enlargement illustrating how fluid exits through Schlemm's canal via the trabecular meshwork (TM);

FIG. 2A is a fully assembled eye model of the present application without a base.

FIG. 4A is an exploded perspective view of the full eye model of FIG. 2A with the lower components as in FIG. 3C assembled, and FIG. 4B is a sectional view thereof;

FIGS. 8A-8C are perspective section views of the eye model with a simulated conjunctiva layer in a sequence that demonstrates an ab externo tube stent procedure; wherein:

FIG. 8A demonstrates how a tunnel might be formed by creating a subconjunctiva hole and piercing through the layers of the eye to access the anterior chamber;

FIG. 8B demonstrates how a tube shunt might be placed in the constructed tunnel so that the entrance of the tube lies inside the anterior chamber;

FIG. 8C demonstrates how the exit of a tube shunt might be placed inside a simulated conjunctival pocket.

DETAILED DESCRIPTION OF THE PREFERRED EMBODIMENTS

The present application provides an eye model that facilitates training of ophthalmic surgical procedures.

The eye model will be used for training ophthalmologists on various ophthalmic surgical procedures. In particular, the eye model can be used to simulate the insertion of multiple implants and devices for treating patients suffering from glaucoma. The eye model will represent (mimic) various anatomical eye structures to enable surgeons to practice different surgical scenarios and thus get themselves ready for the actual procedure on a human eye.

Eye Anatomy Modeled

Figure 1:
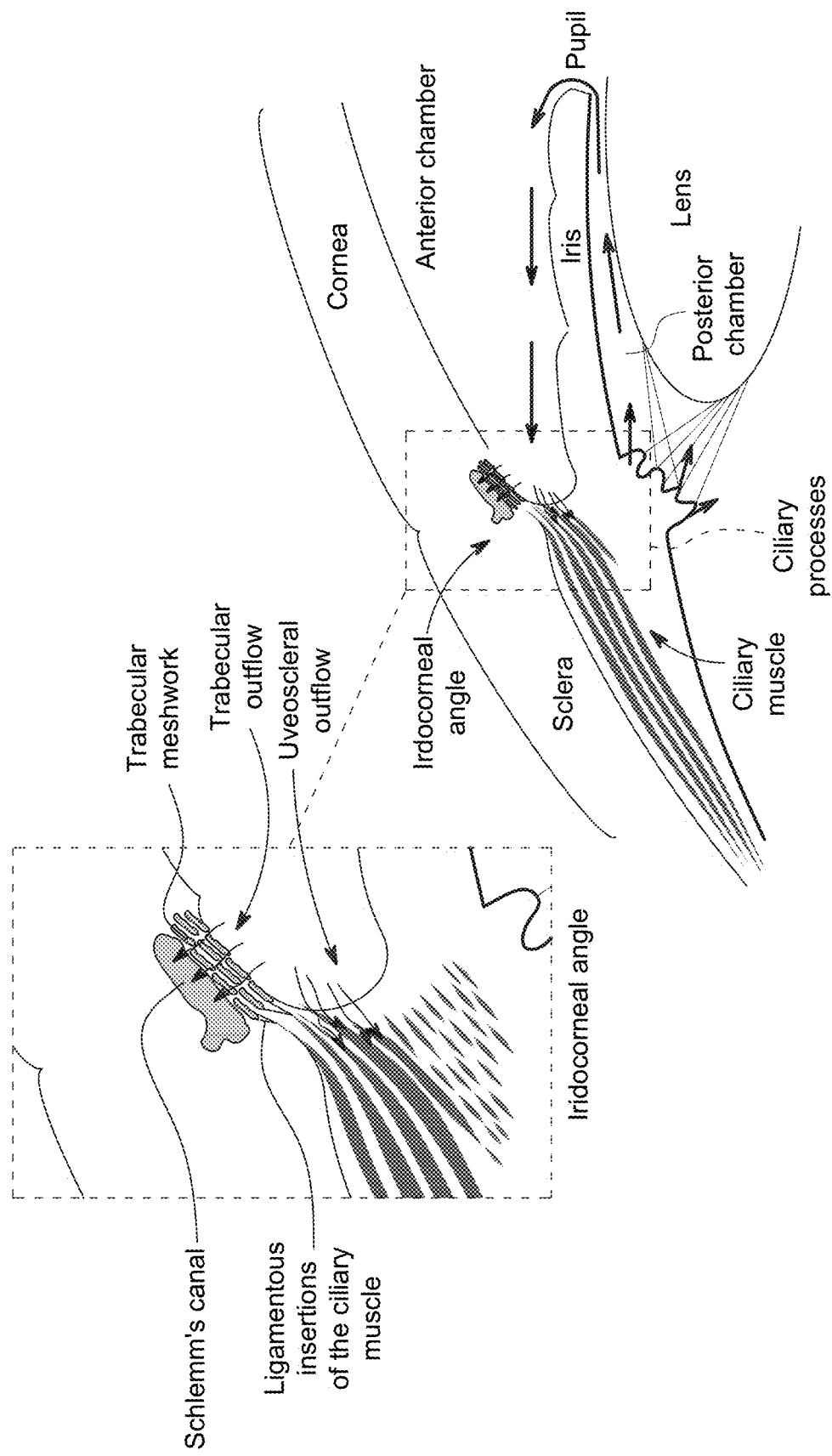
FIG. 1 shows an anatomical diagram of the aqueous humor cycle through one corner of a human eye.

FIG. 1 shows an anatomical diagram of the aqueous humor cycle through one corner of a human eye, and FIG. 1A is an enlargement illustrating how fluid exits through Schlemm's canal via the trabecular meshwork (TM). The aqueous humour is a transparent water-like fluid similar to plasma, but containing low protein concentrations. It is secreted from the ciliary body or processes, a structure supporting the lens of the eyeball. Aqueous humour is continually produced by the ciliary processes and this rate of production must be balanced by an equal rate of aqueous humour drainage. Small variations in the production or outflow of aqueous humour will have a large influence on the intraocular pressure. The drainage route for aqueous humour flow is first through the posterior chamber, then the narrow space between the posterior iris and the anterior lens (contributes to small resistance), through the pupil to enter the anterior chamber. From there, the aqueous humour exits the eye through the trabecular meshwork into Schlemm's canal (a channel at the limbus, i.e., the joining point of the cornea and sclera, which encircles the cornea. In open/wide-angle glaucoma, flow is reduced through the trabecular meshwork, due to the degeneration and obstruction of the trabecular meshwork, whose original function is to absorb the aqueous humor. Loss of aqueous humor absorption leads to increased resistance and thus a chronic, often painless buildup of pressure in the eye.

Various surgical solutions exist for relieving intraocular pressure, and thus hopefully preventing or slowing glaucoma. Canaloplasty is a procedure that opens up Schlemm's canal to relieve pressure inside the eye. One type of canaloplasty uses microcatheter technology. An incision is made into the eye to gain access to the Schlemm's canal. A microcatheter circumnavigates the canal around the iris, enlarging the main drainage channel and its smaller collector channels through the injection of a sterile, gel-like material called viscoelastic. Another type of canaloplasty involves injecting viscoelastic directly behind the TM via a bent cannula in order to dilate and distend Schlemm's canal and collector channel orifices. The most common conventional surgery performed for glaucoma is the trabeculectomy. Here, a partial thickness flap is made in the scleral wall of the eye, and a window opening is made under the flap to remove a portion of the trabecular meshwork. The scleral flap is then sutured loosely back in place to allow fluid to flow out of the eye through this opening, resulting in lowered intraocular pressure and the formation of a bleb or fluid bubble on the surface of the eye. The eye models disclosed herein are useful in teaching medical students the proper techniques for these and other optical surgeries.

Overall Eye Model Structure

Figure 2B:
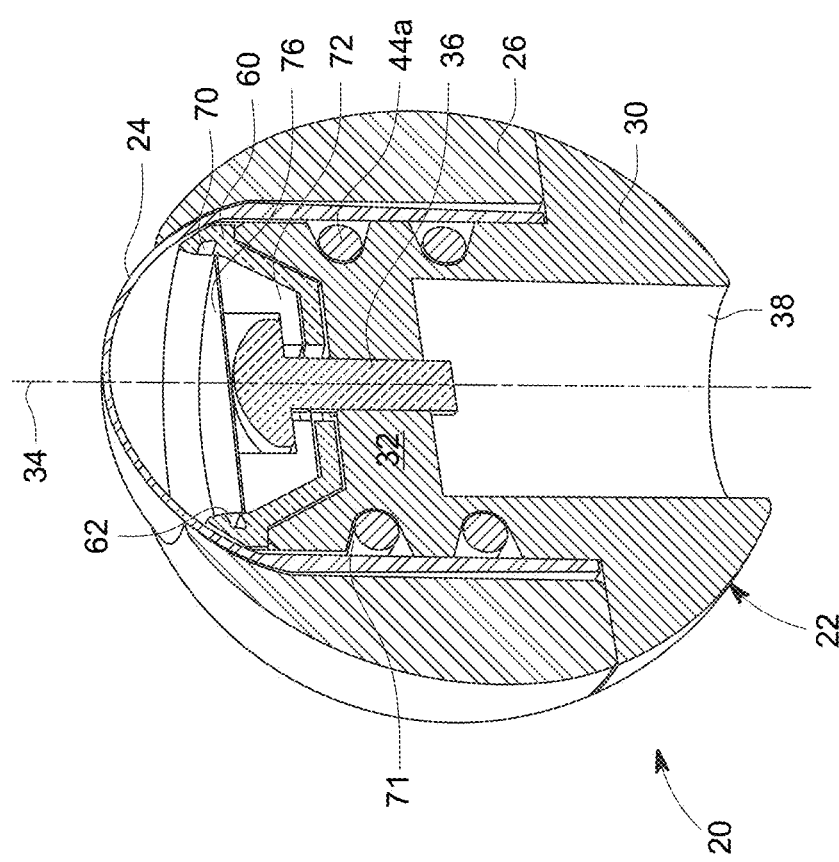
FIG. 2B is vertical sectional view thereof with labeled components indicating a pathway of a sheet/film/wrap that simulates a trabecular meshwork.
Figure 2C:
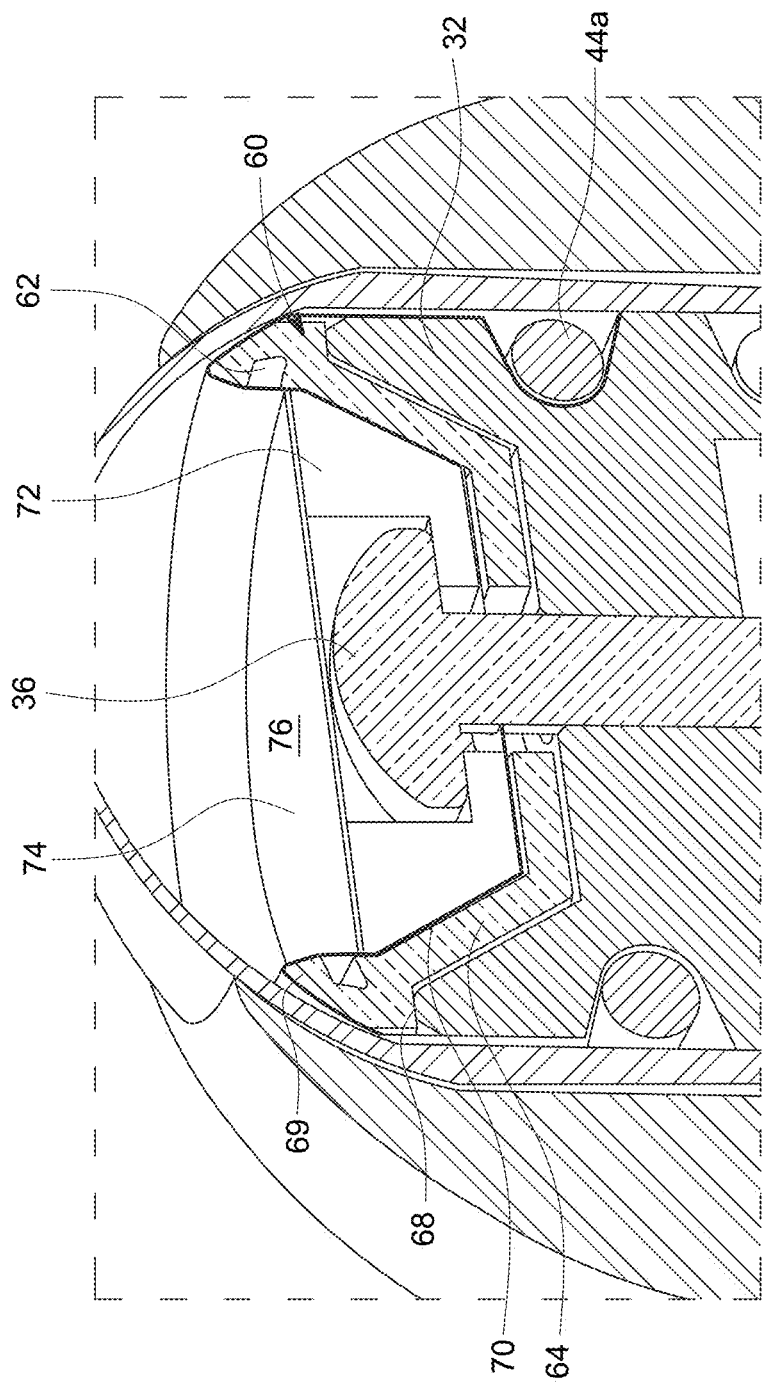
FIG. 2C is an enlargement thereof.

FIG. 2A is a fully assembled eye model 20 of the present application without a base, FIG. 2B is vertical sectional view of the eye model 20 with certain components labeled indicating a pathway of a sheet/film/wrap that simulates a trabecular meshwork, and FIG. 2C is an enlargement thereof.

The eye model 20 includes several outer components which together simulate the spherical shape of the eye. Namely, the eye model 20 has a lower core 22, an inner corneal dome 24 that fits onto the core, and an outer scleral dome 26 surrounding the inner corneal dome. In the illustrated embodiment, the core 22 as a lower somewhat hemispherical body 30 which defines a lower exterior portion of the spherical eye model 20. The core 22 has a generally cylindrical mounting portion 32 that extends upward from the body 30 along the central axis 34 thereof. The various other components of the eye model 20 are secured to the mounting portion 32 in various ways, which may include a central screw 36 that projects downward along the central axis 34. Finally, the core 22 defines a recess or cavity 38 that opens downward and is sized to receive a support post of a mounting base (not shown, described below). It should be noted, however, that a mounting base does not necessarily have to go into a cavity in the eye model, and could be attached externally via magnets, external eye snaps, or an external screw, for example. In general, therefore, the eye model has "attachment structure" for securing to a support base, such as those described below.

With reference also to FIGS. 3A-3D and 4A-4B the various components of the eye model 20 that attach to the core 22 are described. First of all, the core 22 is seen in exploded perspective view in FIGS. 3A-3B, and includes a horizontal step or land 40 on which the outer scleral dome 26 is supported. That is, the dome 26 has a circular, horizontal lower end which rests on the land 40. Secondly, the mounting portion 32 of the core 22 has a pair of circular outer grooves 42a, 42b that are sized to receive elastomeric sheet anchors 44a, 44b, which may be configured similar to standard rubber or silicone O-rings. Though O-rings are convenient, other anchors such as clamps, clips, other forms of cinches, etc., are contemplated. Finally, an upper end of the core 22 defines a frusto-conical wall 46 that narrows downward toward a horizontal floor 48 having a threaded bore for the attachment screw 36 (see FIGS. 3B and 3D). A frusto-conical recess or depression at the upper end of the core 22 is thus formed.

The inner corneal dome 24 can also rest on land 40 or be offset, depending on the corneal height required. Adjustability of the height of the corneal dome 24 is a feature. The corneal dome 24 can be secured in place via a hard scleral dome 26 or, if the scleral dome is soft, the corneal dome can be secured by an O-ring on the outside of the tubular part of the corneal dome which the soft scleral dome pushes into one of the O-ring grooves 42a, 42b on the mounting portion 32 of the core 22.

FIGS. 4A and 4B show the corneal dome 24 and scleral dome 26 exploded above the core 22. The corneal dome 24 has a lower tubular portion 50 and an upper hemispherical portion 52. The tubular lower portion 50 fits closely around the cylindrical mounting portion 32 of the core. The scleral dome 26 has a cylindrical lower bore 54 that fits closely around the tubular portion 50 and a spherically-shaped upper bore 56 that fits closely around the hemispherical portion 52 of the corneal dome 24. A sidewall of the scleral dome 26 widens from top to bottom such that an exterior surface 58 is spherical. The final assembly of these three components, as seen best in FIG. 2B, results in relatively little gaps therebetween.

With reference to FIGS. 3A-3D again, the various inner components of the eye model 20 will be described. As mentioned, the mounting portion 32 of the inner core 22 has a frusto-conical wall 46 at an upper end which receives a similarly-shaped lower end of a Canal frame 60. The Canal frame 60 is capitalized because it defines an inwardly-facing circular groove defining an inwardly-facing Schlemm's Canal 62 at an upper end. The Canal frame 60 has a frusto-conical inner side wall 64 that leads up to a circular enlargement in which the inwardly-facing groove 62 is defined, as well as an upper lip 66 and an outwardly-directed shoulder 68 that rests on the upper rim of the mounting portion 32, as seen best in FIG. 2C.

FIG. 2C is a radial sectional view of the eye model 20 indicating a pathway of a sheet/film/wrap 70 that simulates the trabecular meshwork (TM). This TM/canal can be created by 3 features: Canal Frame 60, Synthetic TM Sheet 70, and at least one Sheet Anchor 44, 72 to create tension. The Canal Frame 60 (rigid or flexible, consisting of one or more components) provides the inner geometry of Schlemm's canal.

Figure 3B:
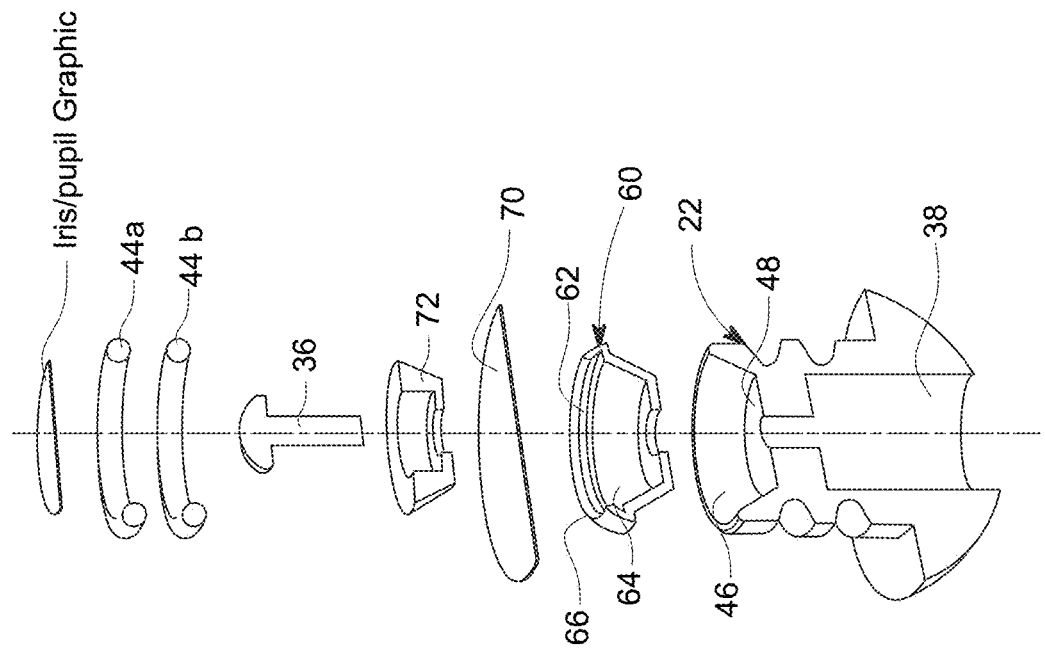
FIG. 3B is a sectional view thereof.
Figure 3A:
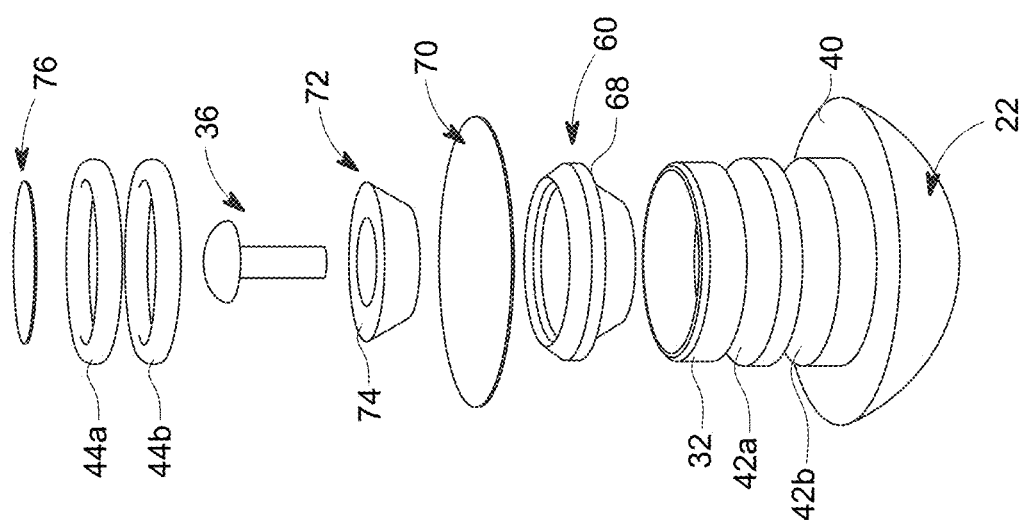
FIG. 3A is an exploded perspective view of certain lower components of the eye model of FIG. 2B.
Figure 3D:
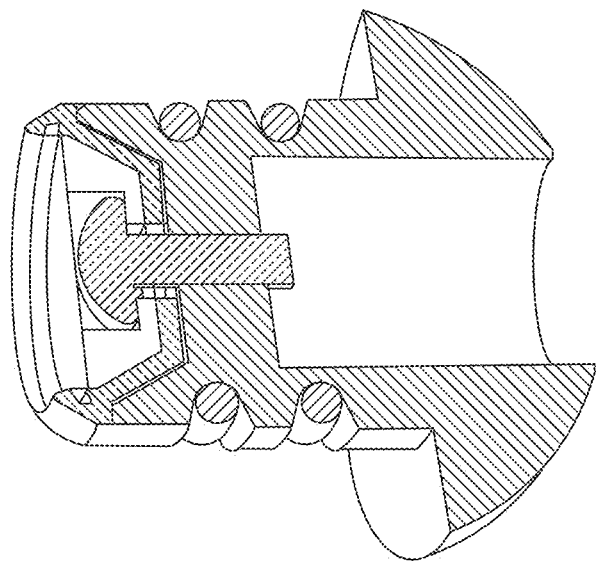
FIG. 3D is a sectional view thereof.
Figure 3C:
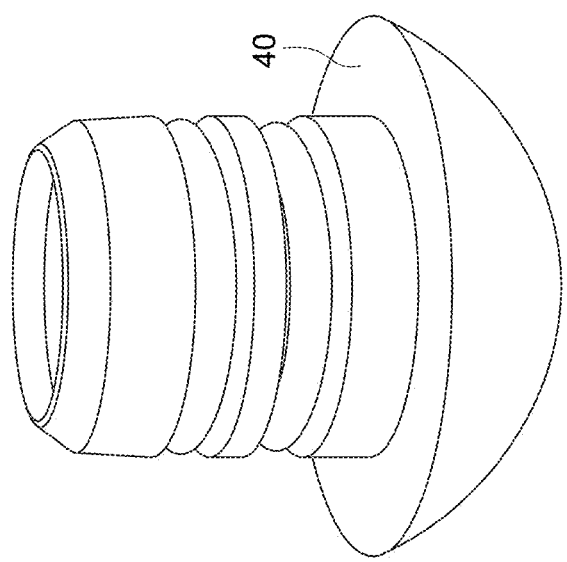
FIG. 3C is an assembled perspective view.

As seen in FIG. 2B, a flexible sheet/film/wrap 70 conforms around the contours of the Canal frame 60 and simulates the trabecular meshwork. More specifically, the flexible sheet 70 extends downward into the frusto-conical depression defined at the upper end of the Canal frame 60 and extends up and then around the outside of the frame and down around the outside of the mounting portion 32 of the inner core 22. The flexible sheet 70 may have a length sufficient to extend past the upper groove 42a, or past the lower grooves 42b, and an outer skirt section 71 is held around the outside of the mounting portion 32 with one or both of the sheet anchors 44a, 44b. The exploded view of FIG. 3A depicts the flexible sheet 70 as circular, which means the lower edges thereof will be pleated or otherwise folded to fit around the cylindrical mounting portion 32. If enough tension is applied across the sheet the folds can be eliminated via stretching. Alternatively, the flexible sheet 70 may be formed with radial slits or other such cutouts which permit the sheet to extend down around the mounting portion 32 without folds.

It should be noted that the sheet 70 simulates the TM by spanning across the inwardly-facing groove defining the Schlemm's Canal 62, and there are a number of ways to suspend the sheet 70 across the groove. As illustrated, the sheet 70 extends around the outside of the Canal frame 60 and downward below the groove, though the sheet 70 could be a circular strip adhered just above and below the groove. Alternatively, the canal frame 60 may be an annular element and the sheet 70 could be wrapped around it to define the TM across the groove as seen in FIGS. 12A and 12B. Those of skill in the art will thus understand there are a number of ways to result in the sheet 70 spanning across the Schlemm's Canal 62.

FIG. 2C shows a frusto-conical sheet clamp 72 on top of the portion of the flexible sheet 70 within the frusto-conical depression defined at the upper end of the Canal frame 60. The sheet clamp 72 has an upper recess and central throughbore to receive the head and shaft, respectively, of the attachment screw 36. When assembled, the sheet clamp 72 presses the flexible sheet 70 downward and against the inner side wall 64 to conform closely within the upper recess of the Canal frame 60. As seen in FIG. 2C, the vertical dimension of the sheet clamp 72 is such that an upper surface 74 thereof is just below the inwardly-facing Schlemm's Canal 62 of the Canal frame 60. As such, a nearly vertical circular span of the flexible sheet 70 extends tautly across the Schlemm's Canal 62.

The flexible sheet/film/wrap 70 simulates a trabecular meshwork stretched over or positioned around and in front of the Schlemm's Canal 62. The sheet/film/wrap 70 may be transparent, and may be made of a variety of materials that represent the trabecular meshwork. For instance, the sheet 70 may be transparent or opaque with a thickness of 0.0001" to 0.0200" and made of plastic, silicone, rubber, or other flexible thin material. The sheet can also be colored or opaque. More alternatives are provided below. This sheet 70 can be pierced, cut, lasered, and/or cauterized as needed during a simulated surgery training.

As shown, the sheet 70 is held across Schlemm's canal 62 by one or more Sheet Anchors: mechanical fixation from each side of the canal, bonding via adhesives, overmolded, or wrapped around the canal itself if the canal is a separate component. FIG. 2B shows the inner Sheet Anchor 72 resembling a washer; namely, a rigid or semi-rigid component used to secure everything together, such as with the screw 36 into the mounting portion 32. Outer sheet anchors 44a, 44b may resemble O-rings, namely a flexible component stretched over the core to keep the Synthetic TM sheet 70 taut. Additional sheet anchors may be used.

Rigid materials for the anchor 72 or any other component of the eye model 20 include plastic (e.g., ABS, polycarbonate or acetal) or metal, which are designed to hold their shape and not deform under expected forces. Semi-rigid materials include dense elastomers such as that used for rubber tires or erasers, and are designed to deform slightly under expected forces but still maintain overall shape.

Alternatively, the sheet 70 may also be secured loosely by Sheet Anchors if it is necessary for the simulated surgical procedure.

Finally, the eye model 20 may incorporate a simulated iris and pupil in the form of a flat disk 76. The flat iris disk 76 may have printing thereon to delineate a border between the iris and pupil, and may also have clock hours printed on it, as shown and described below with reference to FIGS. 15A-15C. As seen in FIG. 2C, the iris disk 76 may be secured with adhesive or the like onto the flat upper surface 74 of the sheet clamp 72. The iris disk 76 thus sits just below the level of the simulated Schlemm's Canal 62.

Figure 5:
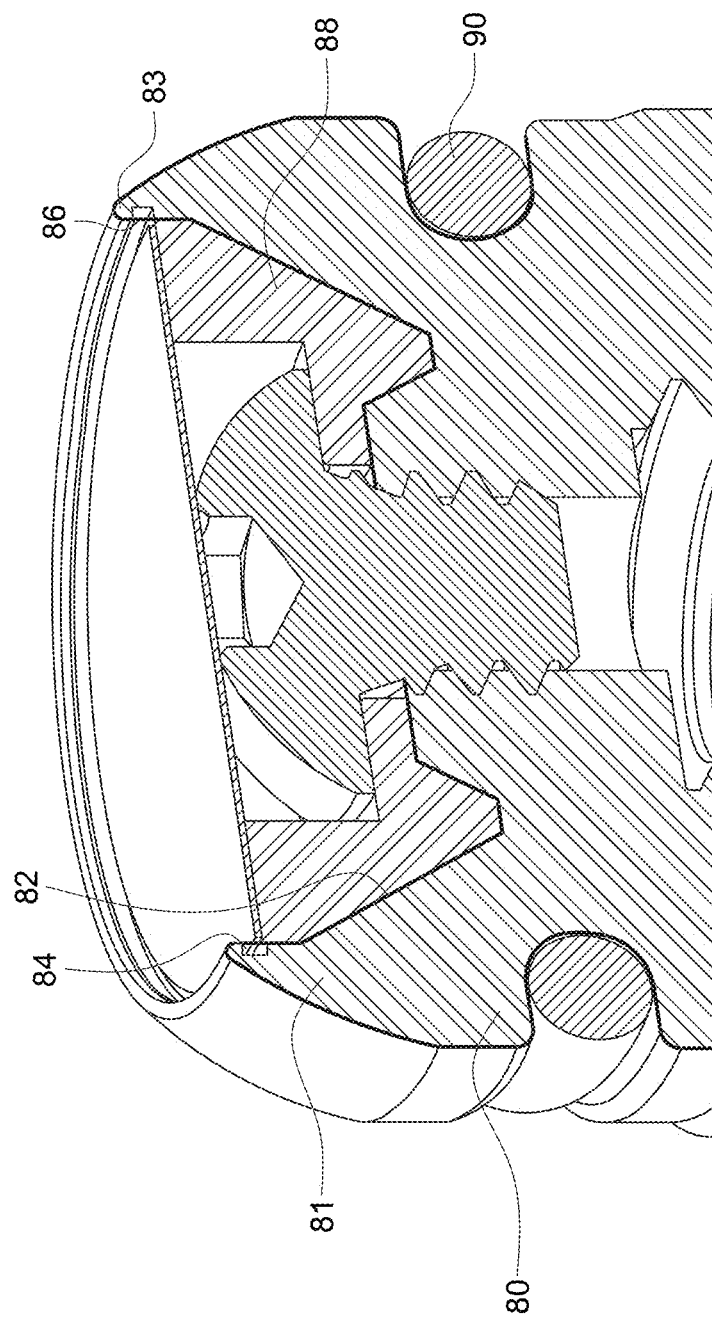
FIG. 5 is a perspective section view that demonstrates a way for the Core and Canal Frame features to be on one component.

FIG. 5 is a perspective section view that demonstrates a way for the eye model core and Canal frame features to be formed in one component in comparison with the design of the simulated eye model in FIG. 2C. Namely, rather than having a separate Canal frame 60 that fits onto the inner core 22, as in the first embodiment, the alternative eye model has an inner core 80 that defines a frusto-conical upper recess 82 having an upper lip 83, and just below the upper lip an inwardly-facing Schlemm's canal 84. That is, the upper end of the inner core 80 defines a Canal frame 81 in that it defines the circular Schlemm's Canal 84. As before, a flexible sheet 86 conforms to the upper recess 82 when held therein by clamp members 88, 90, and spans the inward opening of the Schlemm's canal 84. This reduces the number of parts, though providing a separate Canal frame 60 as in the first embodiment enables a user to more easily swap out Schlemm's canal configurations.

Figure 6:
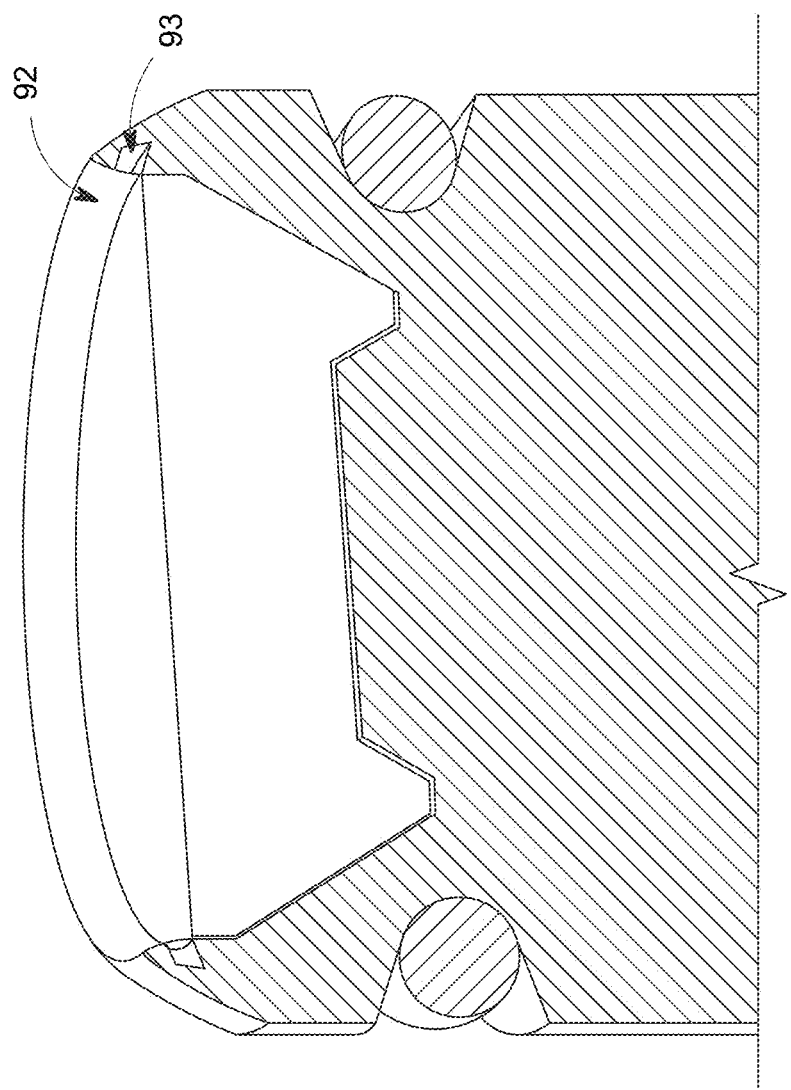
FIG. 6 is a portion of an eye model of the present application having a simulated Schlemm's canal colored for visibility with a clear/semi-opaque sheet/film/wrap.

FIG. 6 is an alternative eye model having a simulated Schlemm's canal colored for visibility. It is important to properly identify the TM before attempting manipulation of the structure. In surgery, the TM is differentiated from the surrounding structures by color and surgeons are trained look for that color. However, during simulation and training a one-to-one replication of the anatomy is not ideal. While a colored TM is necessary for identifying the structure, it can obfuscate what occurs behind it. Full visibility of what occurs behind the TM is ideal for education. The solution is to color to the TM without actually coloring the TM itself by coloring the walls of the groove behind it. Alternatively, a colored TM could be used in conjunction with a colored Schlemm's canal.

In FIG. 6 a thin transparent or semi-opaque synthetic TM 92 in the form of a flexible sheet is again stretched or placed over Schlemm's Canal to form the TM. The TM is made of a transparent or semi-opaque material (that may be colored) to allow the trainee to observe what occurs behind the TM wall and the Schlemm's canal walls 93 behind the TM are colored to aid in anatomic identification. The color may be any that provides good contrast, a natural TM color or artificial bright color, such as a DayGlo green or orange, for representation.

Figure 7:
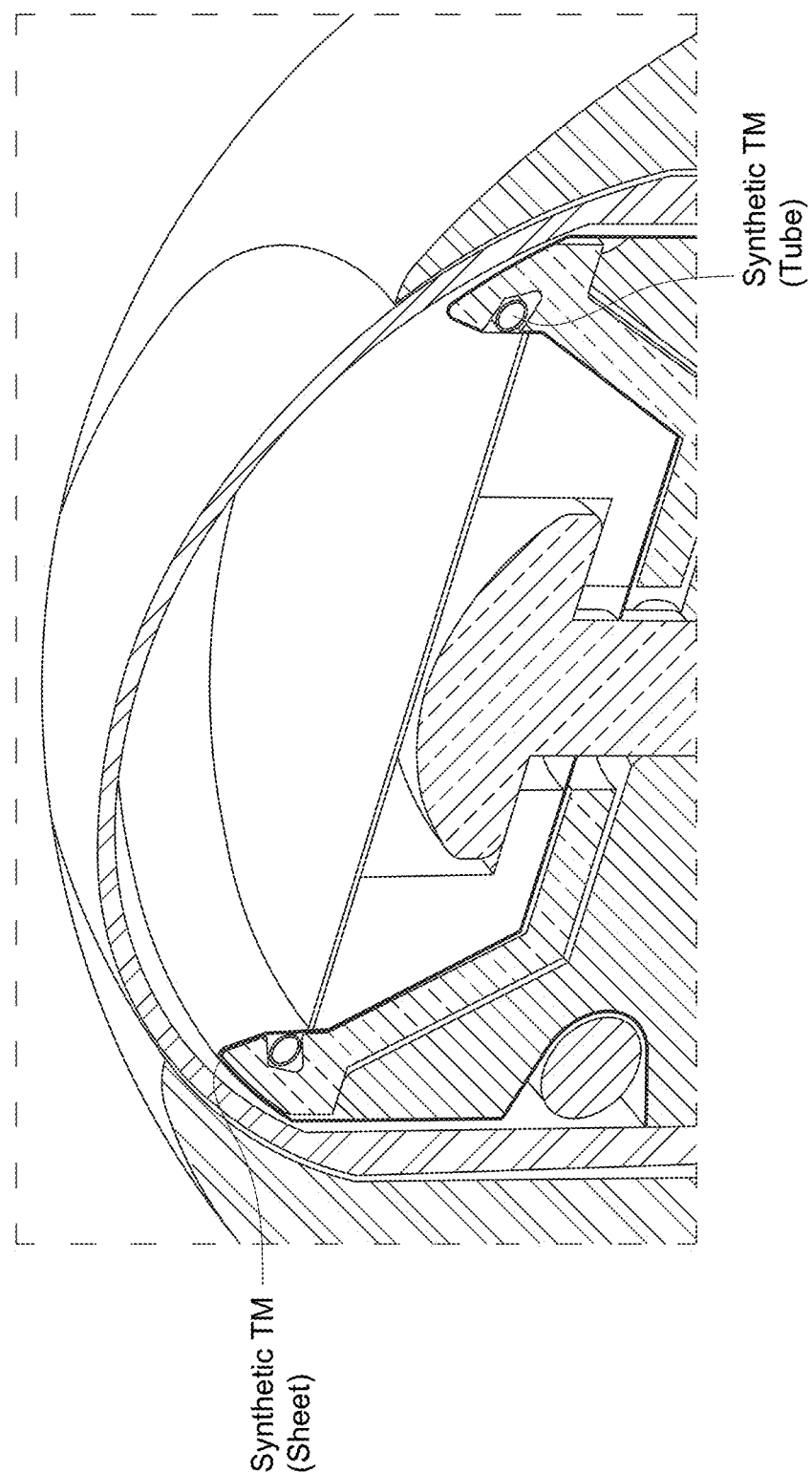
FIG. 7 is a perspective sectional view with labeled TM components that demonstrates a way for the TM to consist of both a sheet in front of Schlemm's canal and a tube behind it within the canal.

FIG. 7 is a perspective sectional view with labeled TM components that demonstrates a way for the TM to consist of both a sheet in front of Schlemm's canal and a tube behind it within the canal. Alternatively, the sheet can be omitted so the TM only consists of a tube.

Figure 8A:
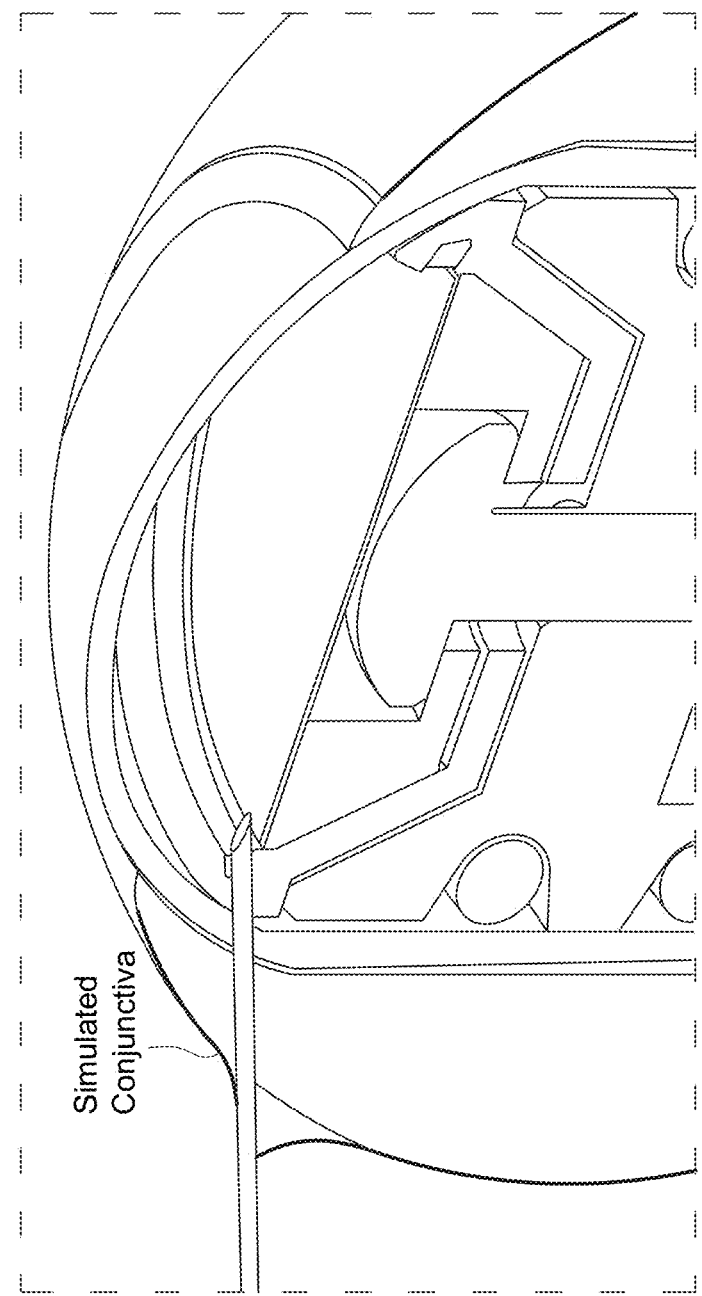
Figure 8B:
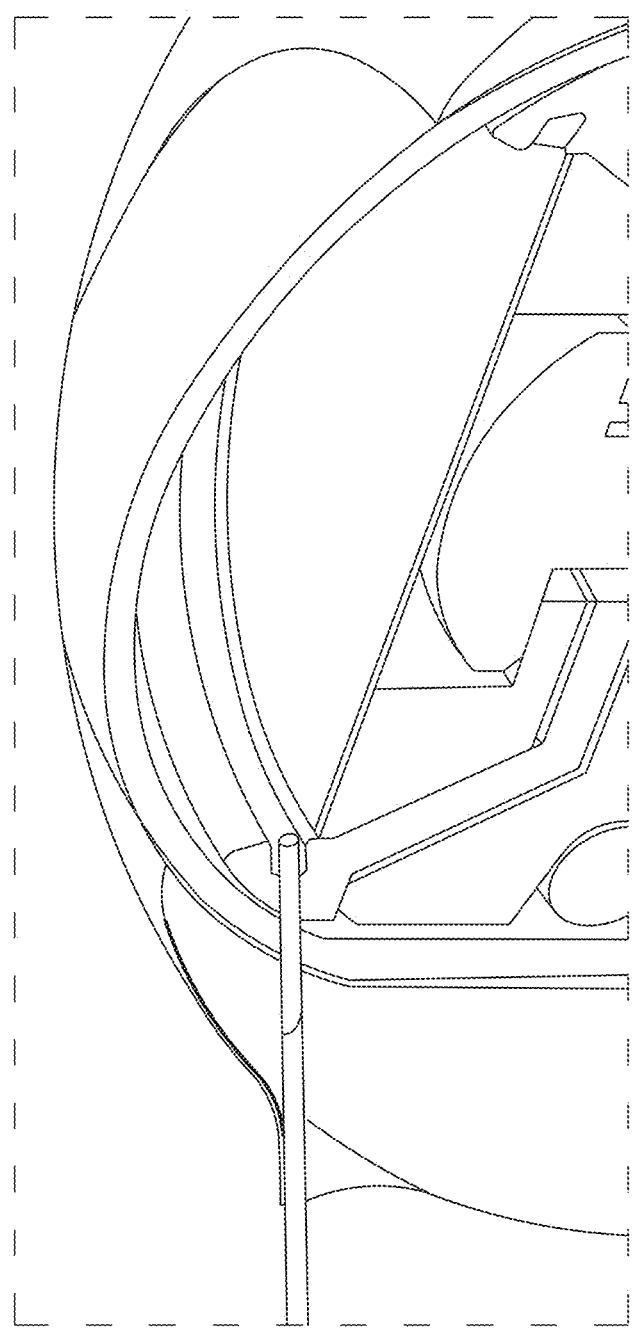
Figure 8C:
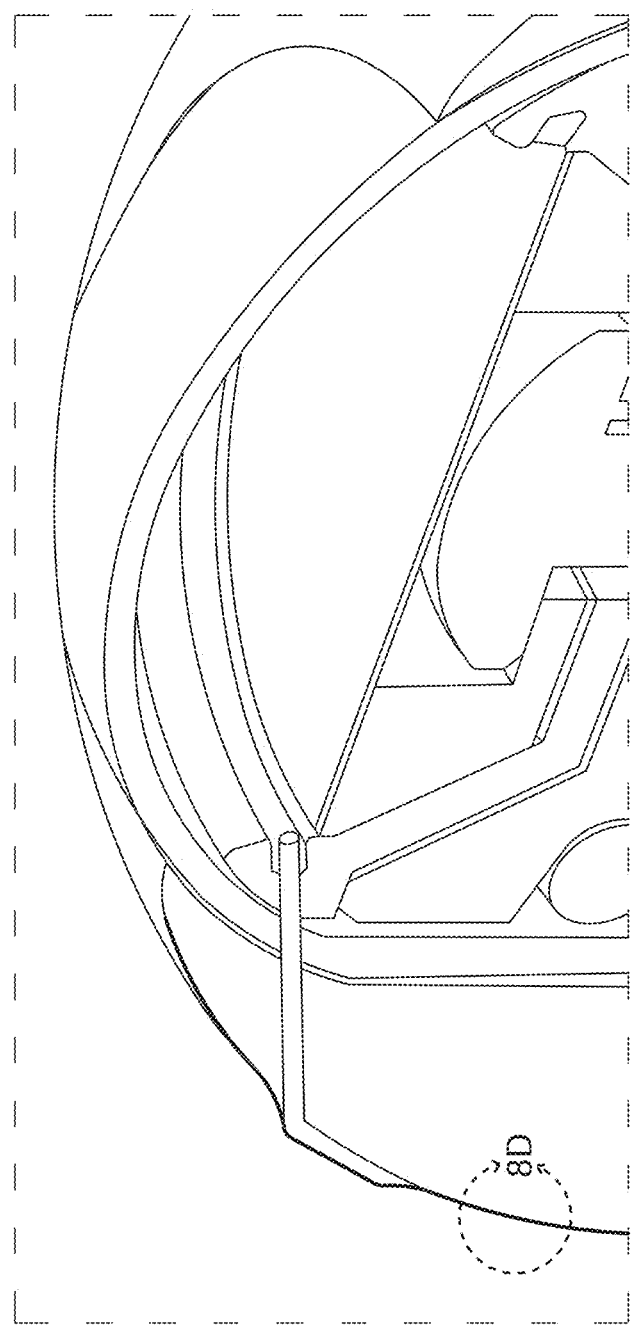

FIGS. 8A-8C are perspective sectional views of the eye model with a simulated conjunctiva layer in a sequence that demonstrates an ab externo tube stent procedure.

First, FIG. 8A demonstrates how a tunnel might be formed by creating a subconjunctiva hole and piercing through the layers of the eye to access the anterior chamber. The conjunctiva layer is thin, flexible, pierceable, and covers part or all the scleral dome to simulate the conjunctiva. The conjunctiva layer may be formed of a thin polymer, such as a transparent plastic layer with a thickness of about 0.1-1 mm. Alternatively, the conjunctiva layer is semi-transparent or opaque. Preferably, the physical surface of the simulated conjunctiva is sticky/tacky.

FIG. 8B demonstrates how a tube shunt might be placed in the constructed tunnel so that the entrance of the tube shunt lies inside the anterior chamber. Finally, FIG. 8C demonstrates how the exit of the tube shunt might be placed inside a simulated conjunctival pocket (i.e., between the conjunctiva layer and the main portion of the scleral dome).

In addition to simulating the conjunctiva layer, simulated extraocular muscles may be added to the eye model. Likewise, physical veins may be added to help train the technician how to avoid them during a procedure.

Figure 9A:
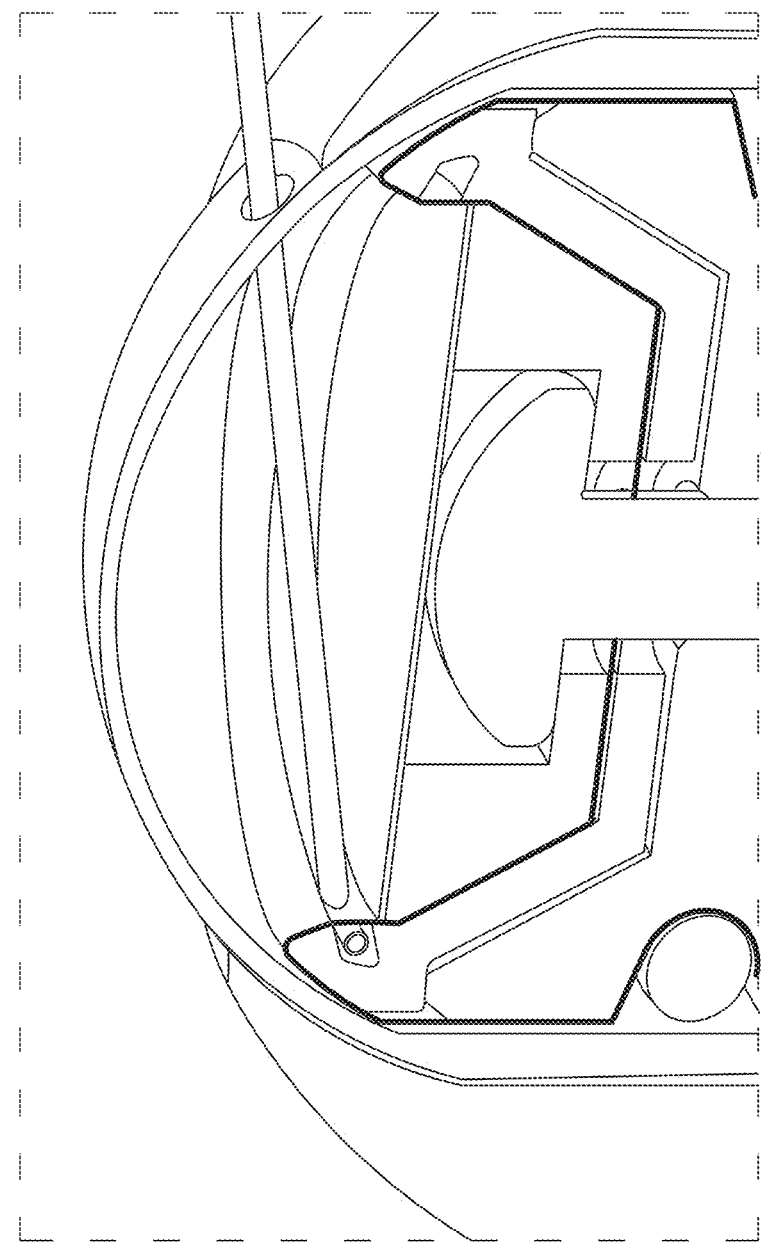
FIG. 9A is a cross sectional view of the eye portion illustrating a canaloplasty via a bent cannula inserted behind the synthetic TM. The thicker black line represents the sheet which creates the Synthetic TM.

FIG. 9A is a cross sectional view of the eye portion illustrating a canaloplasty via a bent cannula inserted behind the synthetic TM. The thicker black line represents the sheet which creates the Synthetic TM.

Figure 9B:
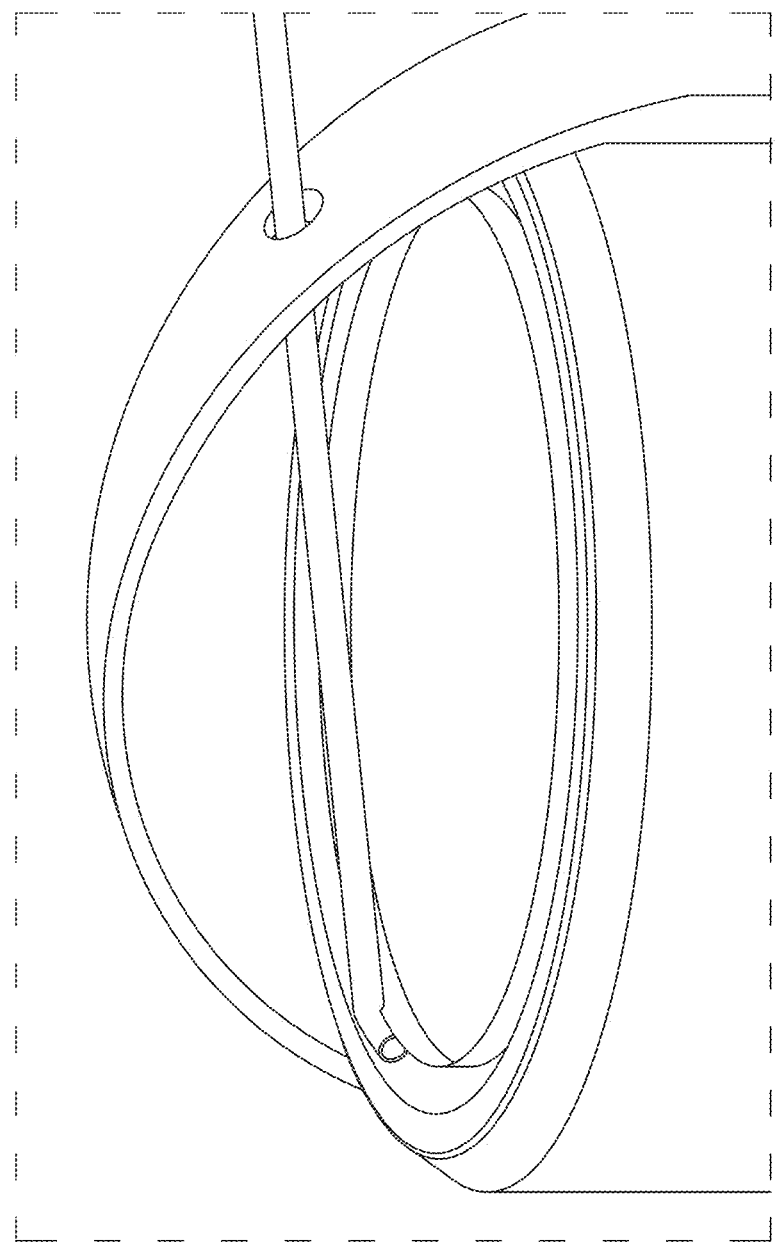
FIG. 9B is a partial cross-sectional view of the eye portion illustrating the possible fluid flow path of a canaloplasty by showing the entire path of Schlemm's canal.

FIG. 9B is a partial cross-sectional view of the eye portion illustrating the possible fluid flow path of a canaloplasty by showing the entire path of Schlemm's canal.

Figure 10A:
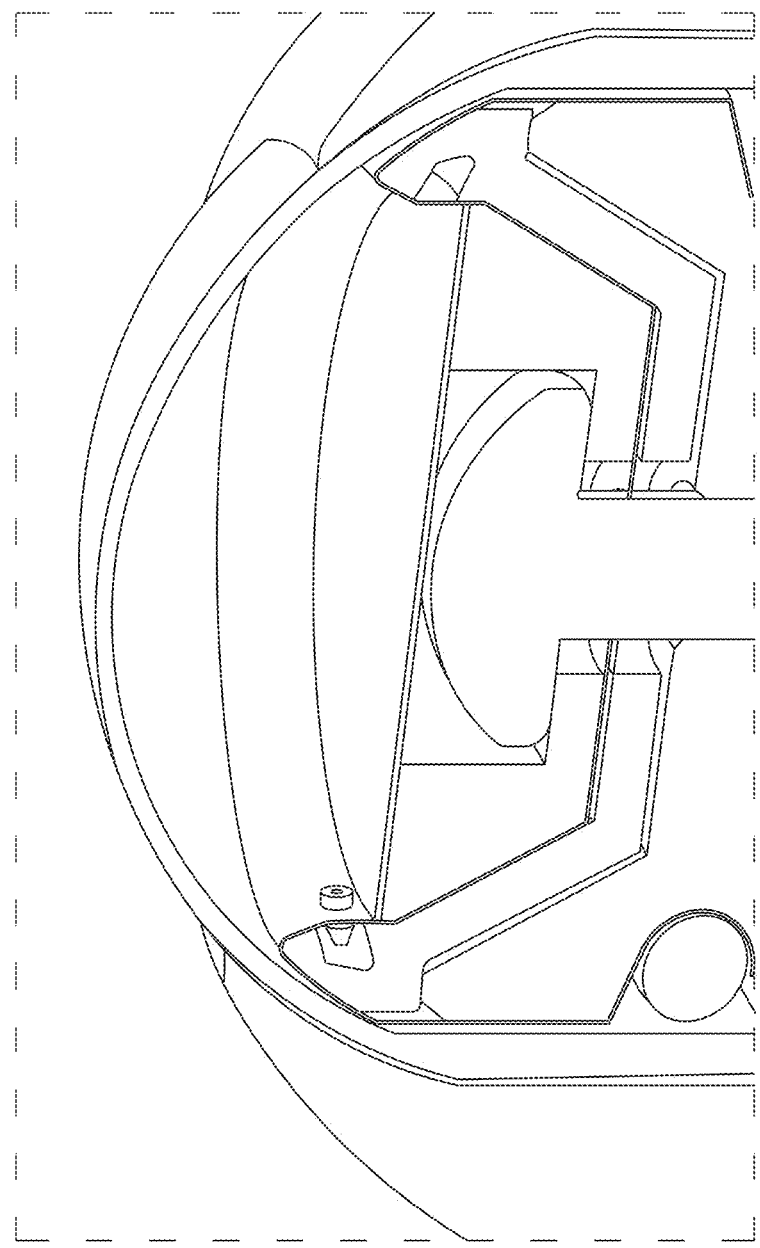
FIG. 10A is a cross sectional view of the eye portion illustrating how a stent would sit after being implanted into the TM.
Figure 10B:
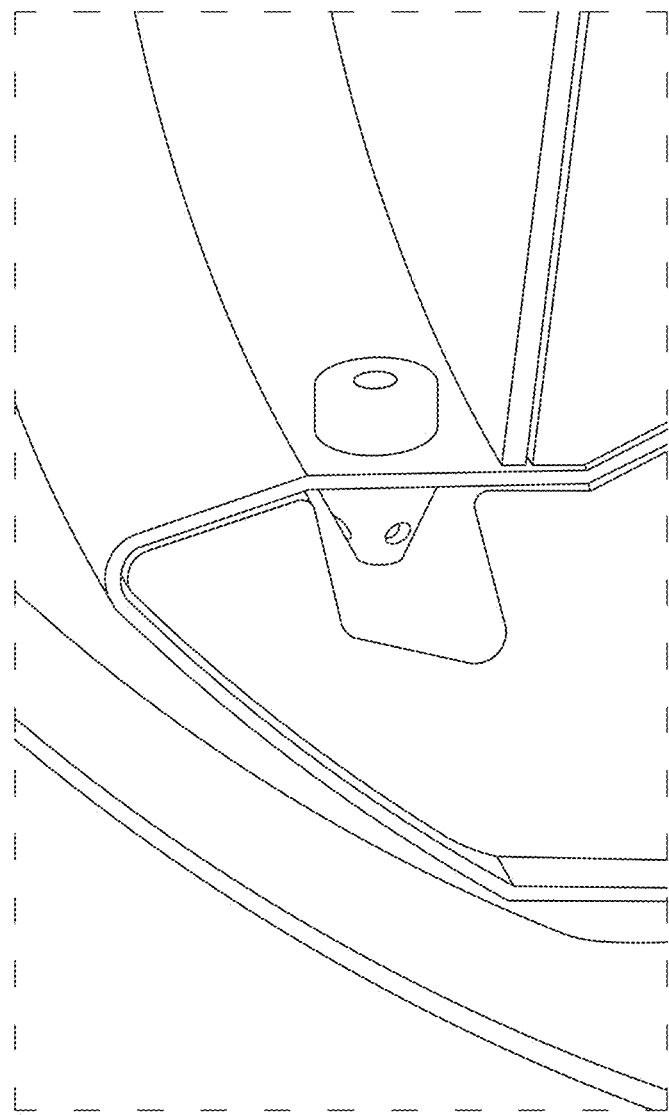
FIG. 10B is an enlarged view thereof.

FIG. 10A is a cross sectional view of the eye portion illustrating how a stent would sit after being implanted into the TM, and FIG. 10B is an enlarged view thereof.

Excisable TM

Figure 11:
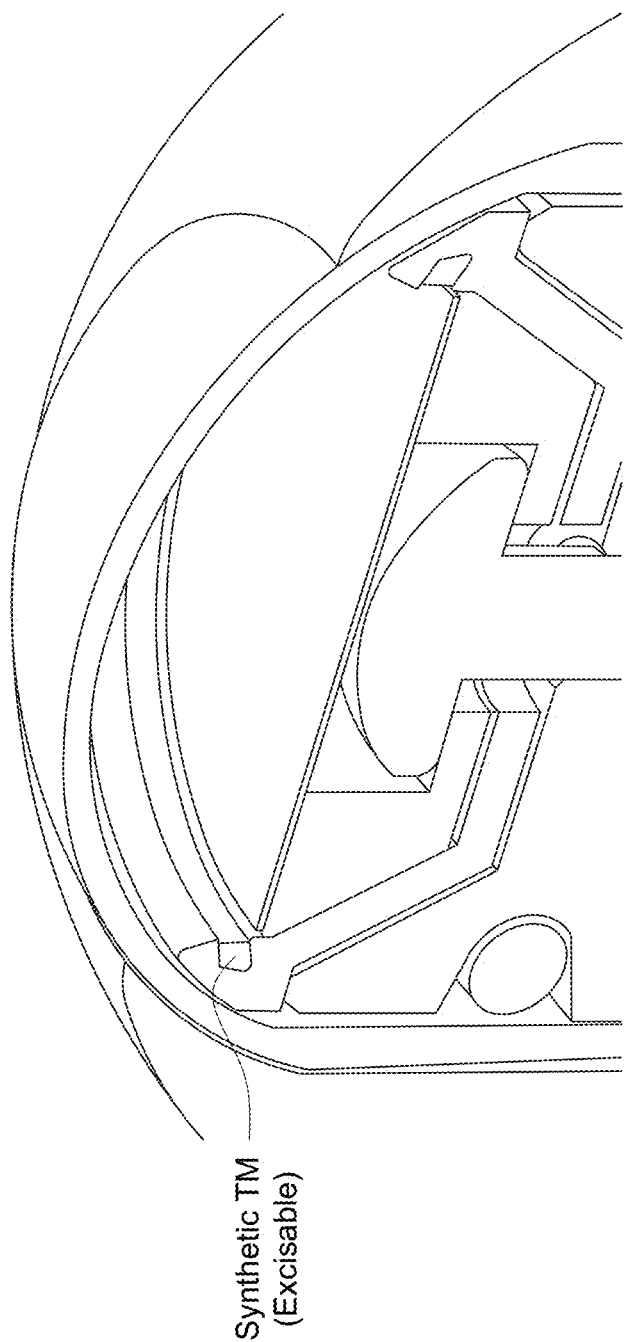
FIG. 11 is an alternative eye model having an excisable simulated TM that is labeled.

For procedures that excise the TM (e.g., goniotomy) the eye model could be of the type identified in FIG. 11. The Synthetic TM would be represented by a semi-solid compound that can be removed in sections. A combination of one or more substances can be used, they include but are not limited to: gelatin, gel, wax, modeling compounds, putty, silicone powder, rubber crumbs, agar, and fiber. This compound may have different consistencies, hardness, and colors as the simulated surgery requires. The term semi-solid refers to a material which is solid in that it does not have fluid flow properties, but which is soft or malleable and excisable, for lack of a better definition. Putty or gel are examples, and the material may have viscoelastic properties in that its response depends on how fast it is deformed—more liquid when deformed slowly.

An alternative approach uses this excisable material with a sheet in front. Using the design of FIG. 2B, modeling compound/agar/gel can be deposited into Schlemm's canal behind the Synthetic TM (Sheet). This gives the surgeon the ability to simulate a canaloplasty and TM excision procedure.

Still another possible solution is to insert an annular ring of soft material within the groove that simulates the Schlemm's canal. For instance, an extremely soft rubber or silicone, or foam material may be used.

Figure 11A:
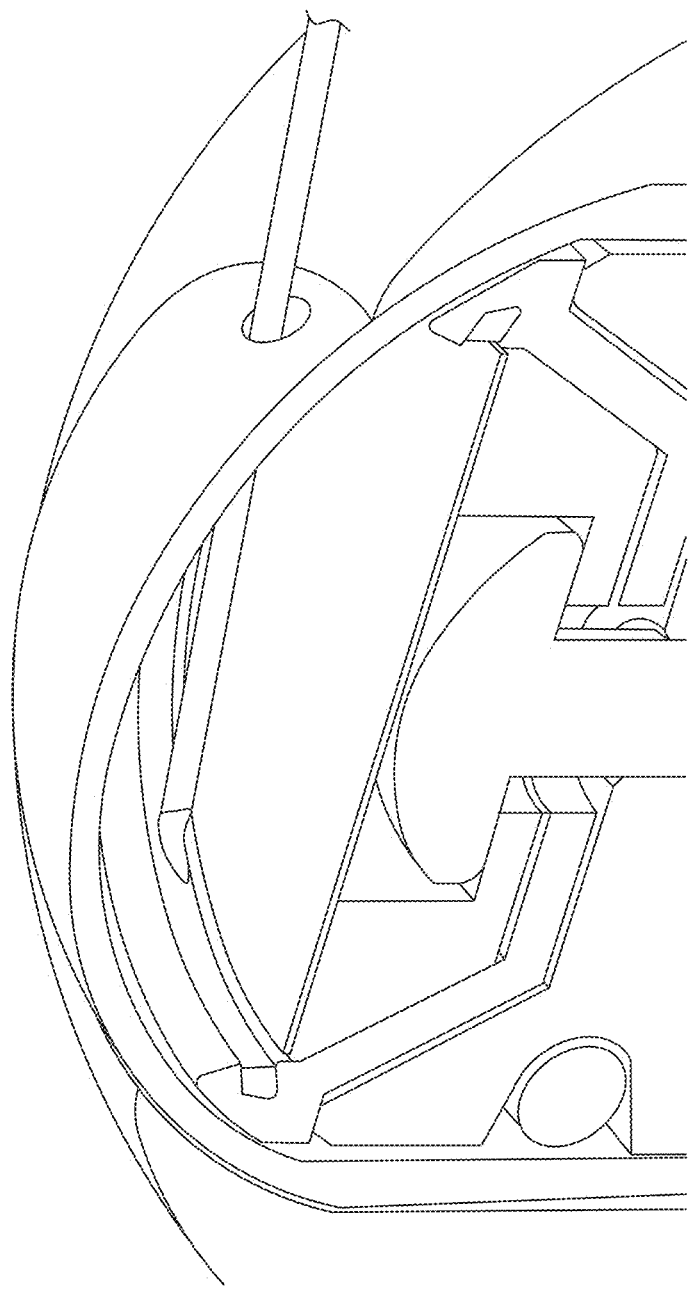
FIG. 11A-11C are cross sectional views of the eye portion illustrating several steps in a TM excision procedure via a needle with a bent tip.
Figure 11B:
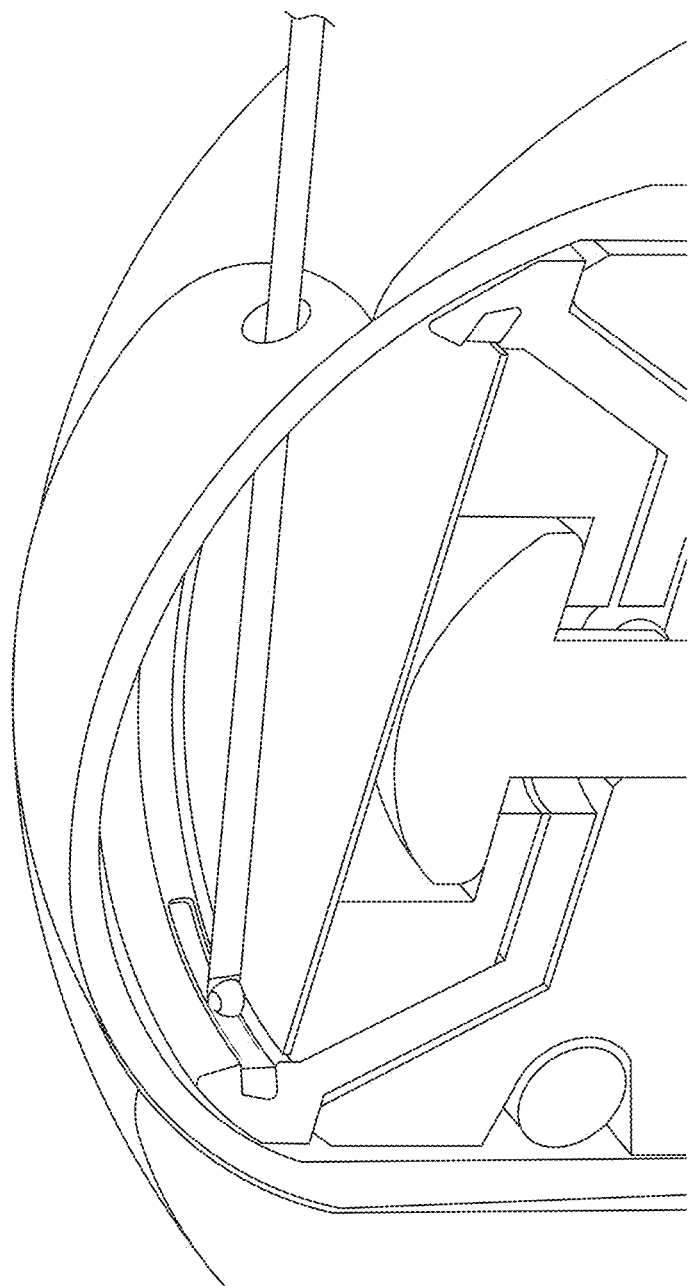
Figure 11C:
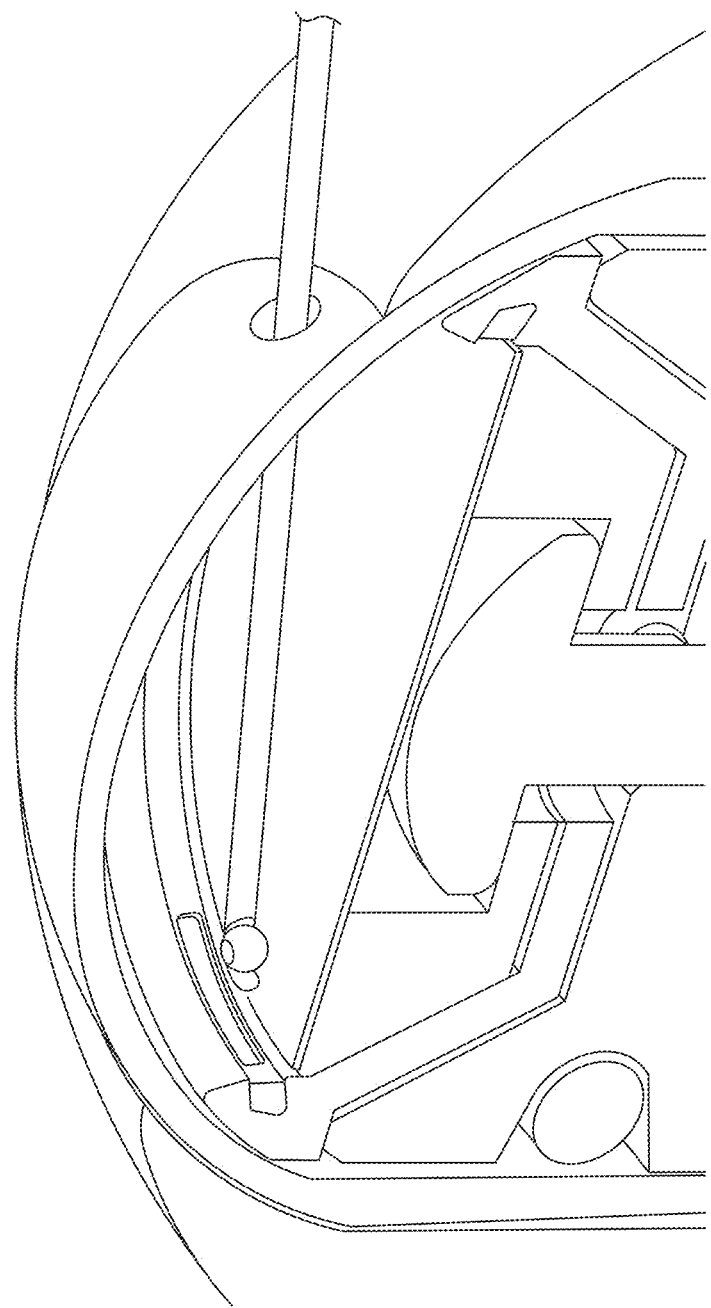

FIG. 11A-11C are cross sectional views of the eye portion illustrating several steps in a TM excision procedure via a needle with a bent tip. First, FIG. 11A illustrates how the needle would enter a slit in the cornea, cross the anterior chamber and advance to the TM before cutting. Next, FIG. 11B illustrates how the needle would cut and separate the TM from the surrounding structures by continuing down Schlemm's canal. The TM may curl as it is separated. Finally, FIG. 11C illustrates how the bent needle would remove the excised TM after a sufficient number of clock hours have been cut.

Figure 12:
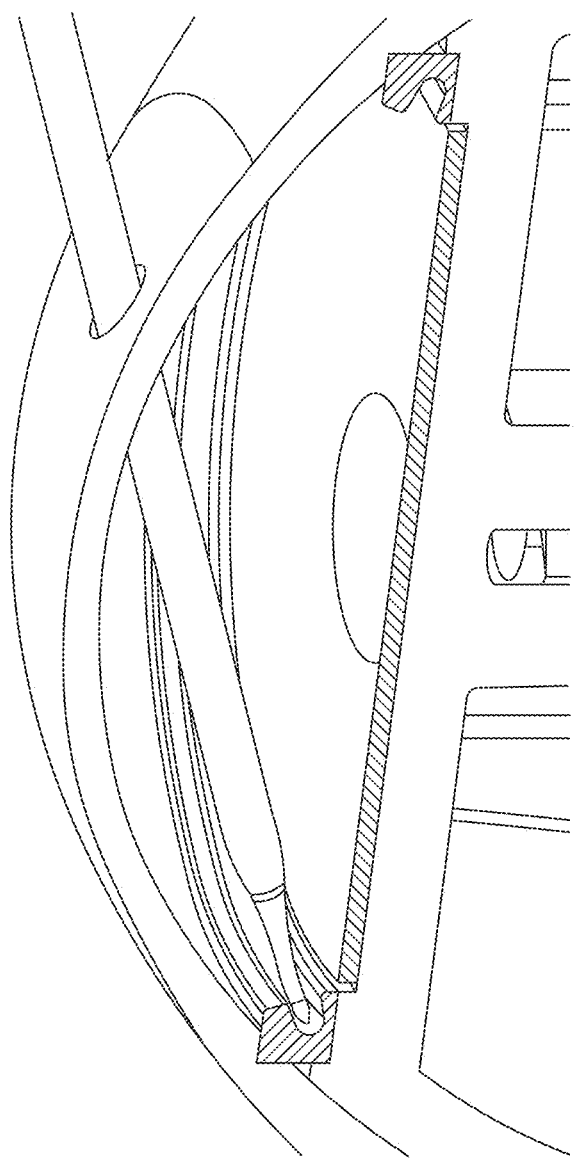
FIG. 12 is an alternative eye model showing a TM excision procedure.
Figure 12A:
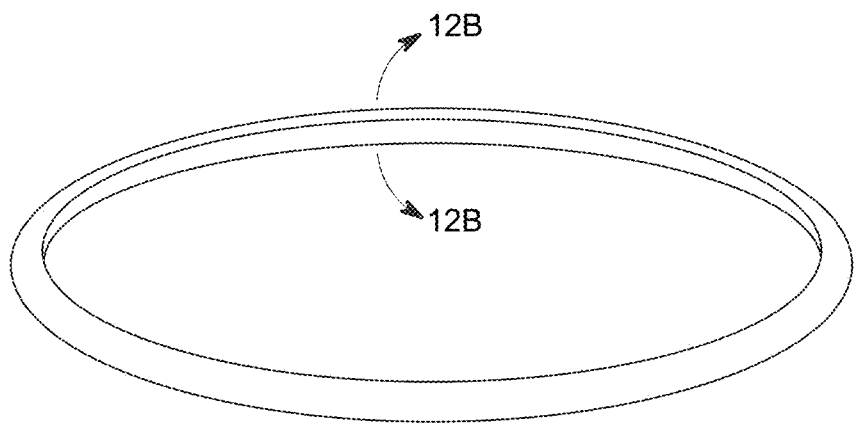
FIGS. 12A and 12B are perspective and sectional views through an alternative annular ring-shaped Schlemm's canal frame with a flexible sheet spanning across a canal groove to simulate the TM.
Figure 12B:
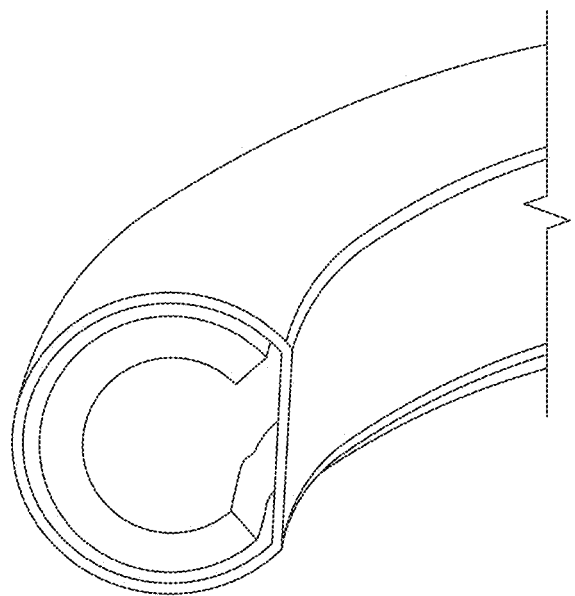

FIG. 12 is an alternative eye model showing a TM excision procedure; specifically, one step in a goniotomy training procedure. The alternative eye model has a Schlemm's canal formed by an annular insert having an inwardly-opening groove simulating the canal. As with other embodiments disclosed herein, the trabecular meshwork may be simulated by using a flexible sheet across the groove, or by placing a semi-solid material or element within the groove which can then be excised. The TM may be contrasted with the surrounding structure by adding color or opacity.

FIGS. 12A and 12B are perspective and sectional views through an alternative annular ring-shaped Schlemm's canal frame with a flexible sheet spanning across a canal groove to simulate the TM. The annular canal frame may be used, for example, in the eye model of FIG. 12. The flexible sheet is a tubular or wrapped member surrounding the frame.

Silicone/Soft Tube as The Schlemm'S Canal and Trabecular Meshwork (TM)

Figure 13A:
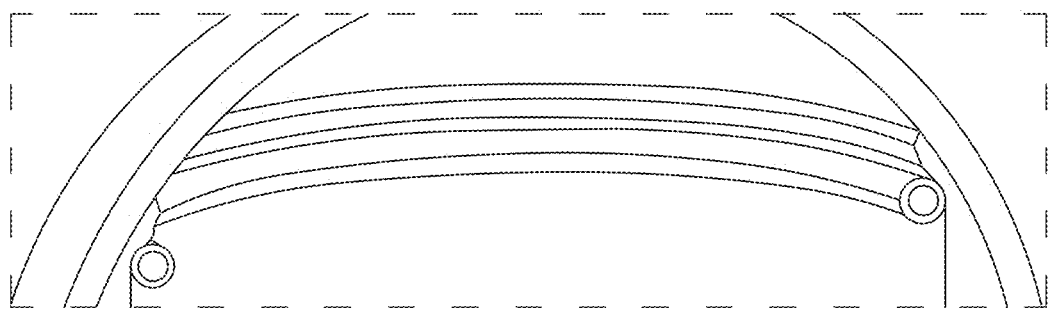
FIG. 13A is a sectional view through a still further eye portion of an eye model that utilizes a full tube to represent the Schlemm's canal.

FIG. 13A is a sectional view through a still further eye portion of an eye model that utilizes a tube to represent the Schlemm's canal.

Figure 13B:
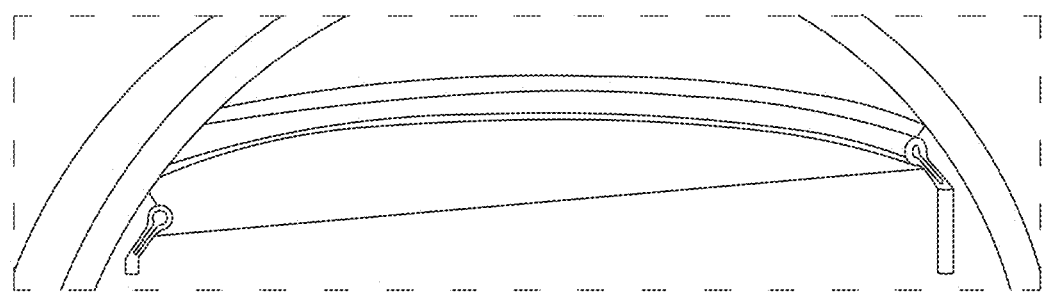
FIG. 13B is a sectional view through the eye portion using a pinched tube to represent the Schlemm's canal.

FIG. 13B is a sectional view through the eye portion using a pinched tube to represent the Schlemm's canal.

A soft and/or flexible tube placed in a circle. The ends can be joined or left separated depending on the application.

When viewing the tube from the anterior chamber, the front outer surface acts as the TM while the inner back wall of the tube acts as the Schlemm's canal. This design allows for the TM and the Schlemm's canal to be from the same component.

The tube can be held with adhesive, mechanically encapsulated, squeezed in place, fixated via internal wire, or a combination there of. Material can be cut, punctured, lasered, cauterized, and removed to mimic TM. This tube can also have holes on the outer perimeter to replicate collector channels. This tube can be pierced both ab interno and ab externo.

Aqueous humor or a viscoelastic solution can be simulated flowing into the tube, flowing inside the tube and also flowing out of the tube. The flexible nature of this tube will also allow it to expand when fluid is placed or passes inside. This tube can be empty, partially filled, or fully filled depending on the surgical simulation need. Different fillers include particles to represent pigment dispersion, blood vessels, and tissue to be excised. Specific fillers can also be used to indicate fluid flow for better visualization. Fillers or tube material can be different colors to match anatomical needs.

To simulate procedures where visibility into or through the canal helps demonstrate the function of a medical device, a transparent/semi-opaque tube may be used. E.g., A medical device would be demonstrated by penetrating the simulated canal and injecting fluid or inserting structures. As the fluid or structure travels through the canal, axially or radially, the progress of the procedure can be observed.

To simulate procedures where the advancement through the Schlemm's canal is not necessary, an opaque tube may be used. E.g., A trans-TM implant could be injected through the simulated TM where it remains anchored in place.

Slit Tube as Schlemm's Canal

Figure 13C:
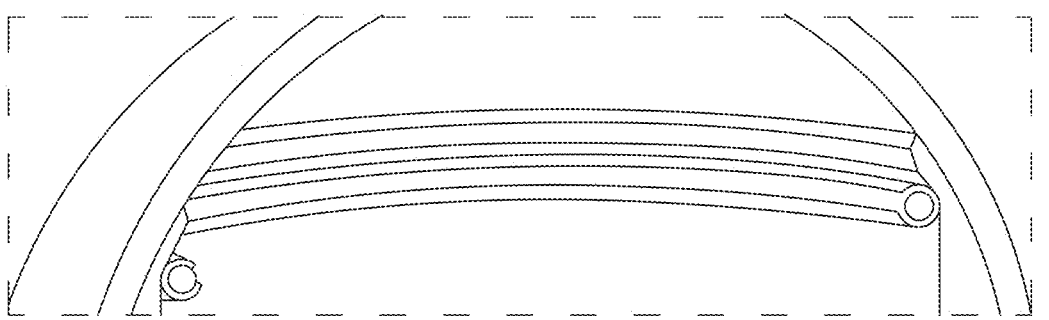
FIG. 13C is a close-up of a slit tube filled with a representative TM material.

A variation to the design utilizes a slit tube to represent the Schlemm's canal. Modeling compound/gel/agar type material fills inside the slit tube to simulate the TM. A combination of one or more substances can be used to create the simulated TM. These substances include but are not limited to: gelatin, gel, wax, modeling compound, putty, silicone powder, rubber crumbs, and fiber. Similar to the previous variation, the slit tube can be held with adhesive, mechanically encapsulated, or squeezed in place.

a. E.g., A surgical blade can enter into the tube through the slit feature and excise the tube filling material simulating a goniotomy FIG. 13C is a close-up of a slit tube which shows a filled interior to represent TM. The simulated TM can be removed mechanically or with a laser.

Internal Wire in Schlemm's Canal

Figure 14A:
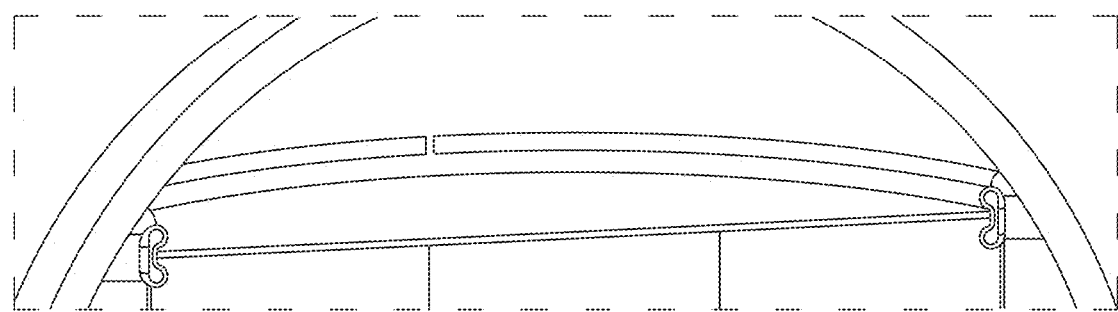
FIG. 14A is a sectional view through the eye portion using a tube fixated with an internal wire and pinched to represent the Schlemm's canal.

FIG. 14A is a sectional view through the eye portion using a tube fixated with an internal wire and pinched to represent the Schlemm's canal.

Figure 14B:
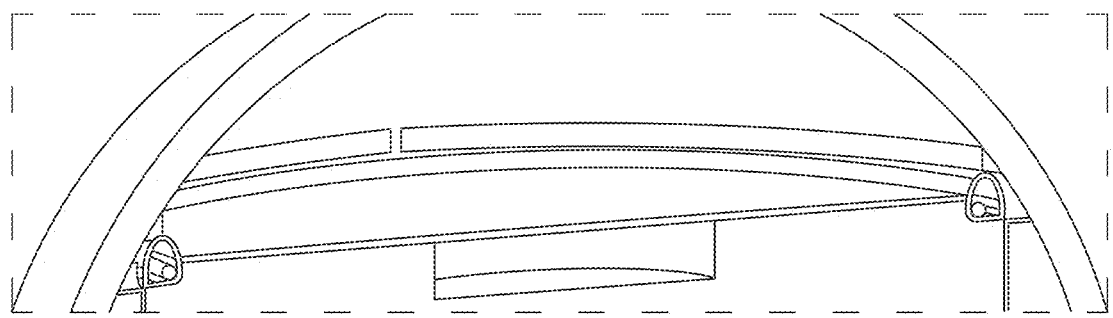
FIG. 14B is a sectional view through the eye portion using another alternative tube fixated via internal wire to represent the Schlemm's canal.

FIG. 14B sectional view through the eye portion using another alternative tube fixated via internal wire to represent the Schlemm's canal.

Unattached Tissues Inside Schlemm's Canal

For simulating fluid movement through Schlemm's canal, powder, coloring pigment, or other small particles (simulating unattached tissues) can be inserted into a simulated Schlemm's canal. When fluid is injected into the canal the particles move with it which demonstrates successful fluid flow. One can also demonstrate a canaloplasty with clear visco-elastic media in the Schlemm's canal that is dyed a dark color. However, dying visco-elastic media is problematic and somewhat labor-intensive. Therefore, to see fluid flow of clear visco-elastic media, unattached particles may be added inside Schlemm's canal so that when the fluid is pushed through the canal the particles move which visualizes a successful canaloplasty.

Fluid Absorption

For simulating fluid absorption, reservoirs are situated next to or underneath a simulated Schlemm's canal. These reservoirs are connected to the canal via fluid path ways and are designed to fill with fluid injected into the eye to simulated fluid absorption during surgery.

Non-Free Spinning Eye Fixation

The back of the eye has a mechanical feature that allows the eye to be secured to a base. The eye is secured and will not move or rotate when experiencing forces on the scale of those exerted during simulated surgery. To access different quadrants, torque can be applied to rotate the eye using only the human hand, no tools are needed. After rotation ceases the eye remains stable for further simulated surgery.

Iris Clock Hours

As mentioned, the eye model 20 may incorporate a simulated iris and pupil in the form of a flat disk 76 placed onto the sheet clamp 72. Twelve markings (radial lines, dots, etc.) are equally spaced around the iris (30-degree separation). The spacing of these markings represent clock-hours. The number of markings may increase or decrease but should always represent clock divisions. (e.g., The number could be reduced to 4 to represent the 3-hour increments or increased to 24 to represent 30 min increments). These graduations help determine distance when training for various anterior chamber operations. Examples are seen in FIGS. 15A-15C.

Figure 15A:
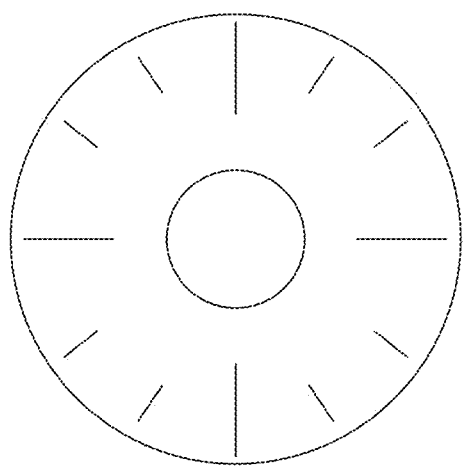
FIGS. 15A-15C are variations on a clock face imprinted on a simulated iris.
Figure 15B:
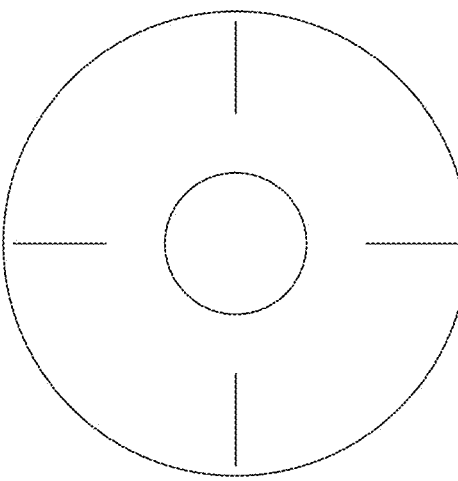
Figure 15C:
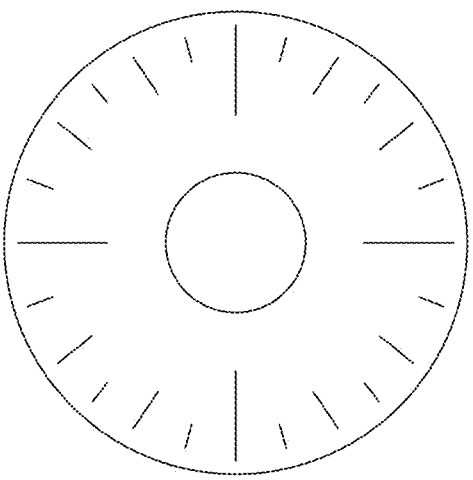

FIGS. 15A-15C are variations on a clock face index imprinted on a simulated iris. An iris/pupil graphic sits in the center of the sheet anchor to give a graphical representation of the iris and pupil. This graphic is cosmetic only and does not affect functionality. The flat disk 76 with printing may be attached to the sheet clamp 72 via adhesives, or the printing may be reproduced directly on sheet clamp 72. FIG. 15A shows all 12 hours of the clock, FIG. 15B shows just the quarter hours of the clock, and FIG. 15C shows all 12 hours of the clock plus half hours in-between, for a total of 24 indices or hash marks.

Transparent Components

While training with anatomy in its natural color and feel is critical for learning, a transparent anatomy model is, in certain cases, more efficient at demonstrating the anatomical structures that are not readily apparent. Transparent or partially transparent anatomy models are often used to help visualize body systems in a three-dimensional way. Being able to see into or see through an anatomy structure gives invaluable insight into that system.

An alternate design is to have some or all components of the eye to be transparent. While not ideal for standard surgical simulation, it greatly enhances the perception of seeing a fluid or catheter traversing schlemm's canal groove.

Having the canal frame, TM material, cornea and scleral dome all be transparent allows visualization of device movement, fluid movement or device placement both internally and externally to the eye. Because a gonioprism is needed to see into the angle, and accompanied by the use of a microscope, the practitioner is limited in their perception. Being able to visualize externally helps conceptualize the internal surgery, and can help a proctor/trainer to follow simulated surgery steps as well. When fluid moves in the Schlemm's canal it travels in three dimensions and is difficult to visualize when observing a small area under a microscope. With a canal frame equipped with collector channels, fluid not only travels around the canal groove, but also out through the collector channel pathways. A transparent eye structure allows not only visualization, but also a deeper understanding of these fluid flows.

Design Approach

When simulating a surgery, certain anatomical features need to be represented in flexible materials that are similar to tissue. However, such materials may not provide the required structural stability needed for the proper handling of a training eye.

A modular approach as seen in the figures, and in particular FIGS. 2A-2C, comprises a layered design built around a rigid inner Core. FIG. 2B is a vertical sectional view through an alternative assembled eye portion shown without a base. The eye portion is formed of a number of different simulated anatomical components or layers. Multiple components are used to achieve different purposes. Rigid components (non-anatomical) provide necessary stability for educational manipulation. The inner Core may be the only rigid component. Flexible components provide proper anatomical material properties like flexibility and pierceability. In addition, a central screw or other mechanical fixation may be used to hold the remaining components to the Core.

Anatomical features that require a tissue like properties (e.g., flexibility, pierceability, smoothness, etc.) are represented in separate layers with corresponding material properties. The layer is then secured to the Core. This Core does not simulate tissue properties (except by outer shape, if necessary). Instead, it secures and provides stability for all layers that contain the anatomical modular pieces via mechanical attachment (e.g., O-ring grooves, threaded holes, encapsulation, snaps, etc.), adhesives, or magnetic attachment. This layered solution can be repeated using multiple components of various material, all of which would be secured to the Core.

Features/Components

The eye consists of 5 features at minimum: Core, Scleral Dome, Corneal Dome, Canal Frame, and Synthetic trabecular meshwork (TM). These features may be combined into 5 or less components. For example, the Canal Frame can be built directly into the Core or kept separate.

For TM piercing procedures the eye consists of 7 features: Core, Scleral Dome, Corneal Dome, Canal Frame, Synthetic TM (Sheet/Tube), Sheet Anchoring, and an Iris/Pupil Graphic.

For TM removal procedures the eye consists of 6 features: Core, Scleral Dome, Corneal Dome, Canal Frame, Synthetic TM (Excisable), and an Iris/Pupil Graphic.

Other combinations of the Canal Frame and Synthetic TM components can be used to achieve different TM behavior for various TM manipulation surgeries.

The Core mechanically attaches onto a pedestal and it is secured in place. This structure is made of rigid plastic/metal or a high durometer material and is not pierceable. It exists to keep the eye's shape and provide stability for the other parts of the eye which are involved in surgery.

The Scleral Dome is the outermost part of the eye, representing the sclera and conjunctiva, and can either be rigid (above Shore A 80) or soft and pierceable (Shore 00 10 to Shore A 80), depending on the needs of the procedure. The Scleral Dome can be opaque, semi-opaque, translucent, or transparent. The Scleral Dome can have features to mark the identifiable structures in the eye necessary for ophthalmic procedures. It may create a spherical or partial spherical shape.

The Corneal Dome can be a transparent silicone, gelatin or other polymeric material simulating the corneal tissue and is pierceable. It encapsulates the top portion of the Core and all prior layers. If the procedure passes a laser through the Corneal Dome, then it should have an index of refraction from 1.3 to 1.5 which matches that of the human cornea in most studies.

The Canal Frame contains Schlemm's canal and can be rigid (above Shore A 80) for ab interno approaches that do not need to manipulate Schlemm's canal or pierceable and flexible (Shore 00 30 to Shore A 80) for ab interno or ab externo approaches that manipulate Schlemm's canal. If the Canal Frame is to be rigid the feature can be combined onto the Core component. The back wall(s) of Schlemm's canal may be colored to aid in visual identification of the structure.

The Synthetic TM can be represented by various components depending on the surgery being simulated:

For procedures that require instruments to pass through the TM (e.g., canaloplasty or stenting) it would be represented by a sheet/film/wrap stretched over Schlemm's canal and anchored. The sheet can be transparent to provide visibility for actions beneath the TM or it can be opaque for procedures where this is unnecessary. This sheet can also be colored to match anatomy or with an artificial bright color, such as a DayGlo green or orange, for representation.

For procedures that excise the TM (e.g., goniotomy) the TM would be represented by a modeling compound/gel/agar type material that can be removed in sections. A combination of this excisable material with a sheet in front is an alternative.

For procedures that inject an implant through the TM a sheet may be used alone or in conjunction with a tube or excisable material behind it for added anchoring stability. A tube can also be used alone in place of a sheet.

An iris/pupil graphic sits in the center of the sheet anchor to give a graphical representation of the iris and pupil. Clock hours, as shown in FIGS. 15A-15C, may be printed on this graphic. This graphic is cosmetic only and does not affect functionality. An iris/pupil graphic with or without clock hours may be attached to Sheet Anchor 1 via adhesives or reproduced directly on Sheet Anchor 1.

The iridocorneal angle is created between the Canal Frame and Sheet Anchor 1.

The combination of the eye components can create a water-tight simulated anterior chamber to contain viscoelastic type fluids used in surgery. Alternatively, some fluid flow in and out of the eye model may be acceptable, either from leakage or deliberately.

The eye model does not need to be a full eye globe, it can be hemispherical or semi-spherical as the structures behind the anterior chamber do not need to be represented for TM manipulation procedures.

Collector Channels

In the back of the Canal Frame, venting holes (simulating collector channels) allow fluid to travel out of the frame and into venting vessels (simulating intrascleral and episcleral vessels). These venting vessels can be transparent/semi-transparent tubes or can be a groove in the Frame with a semi-transparent layer on top to trap the fluid within the grooves.

Conjunctiva

A simulated conjunctiva layer can be placed over the Scleral Globe to allow for ab externo procedures that require manipulation of the conjunctiva. This layer would be thin, flexible, pierceable and can be transparent, opaque, or semi-opaque. This sheet/film/wrap can be made of plastic, silicone, rubber, or other flexible thin material. It can be transparent, opaque, or semi-opaque as the simulated surgery requires. This layer can be pierced, cut, lasered, and cauterized.

Additional simulated extraocular tissue structures can be added to the conjunctiva to expand on the techniques able to be practiced. Simulated extraocular muscles can be added to practice manipulation techniques. Physical veins can be added to practice cauterization techniques. Cosmetic versions of either could be added for location indicators.

Figure 8D:
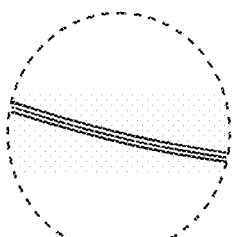
FIG. 8D is an enlargement of a section of the simulated conjunctiva in FIG. 8C.

The conjunctiva could be created from multiple layers to allow the surgeon to practice delineation and manipulation. Liquid could be added as a layer between the conjunctiva and dome for realism. For instance, FIG. 8D is an enlargement of a section of the simulated conjunctiva with 2 layers on the outside of the scleral dome, shown with spaces therebetween, but which may also lie in abutment. Fluid layer(s) may be included between solid layers, such as in the spaces, to further simulate the anatomy within the eye.

The surface of the conjunctiva (inside or outside) can be set in different ways changing how the simulated tissue interacts with other simulated tissue or how it interacts with surgical instruments. For example: making the conjunctiva sticky/tacky would mimic real world behavior for practicing separation techniques.

The conjunctiva can be stretched over the sclera, adhered to the sclera or heat bonded. The material of the sclera can also be altered to adjust the stretchability, color, as well as its ease of tearing. The ability to adjust these factors help mimic patient age or diseases.

Pedestal Bases

Figure 16B:
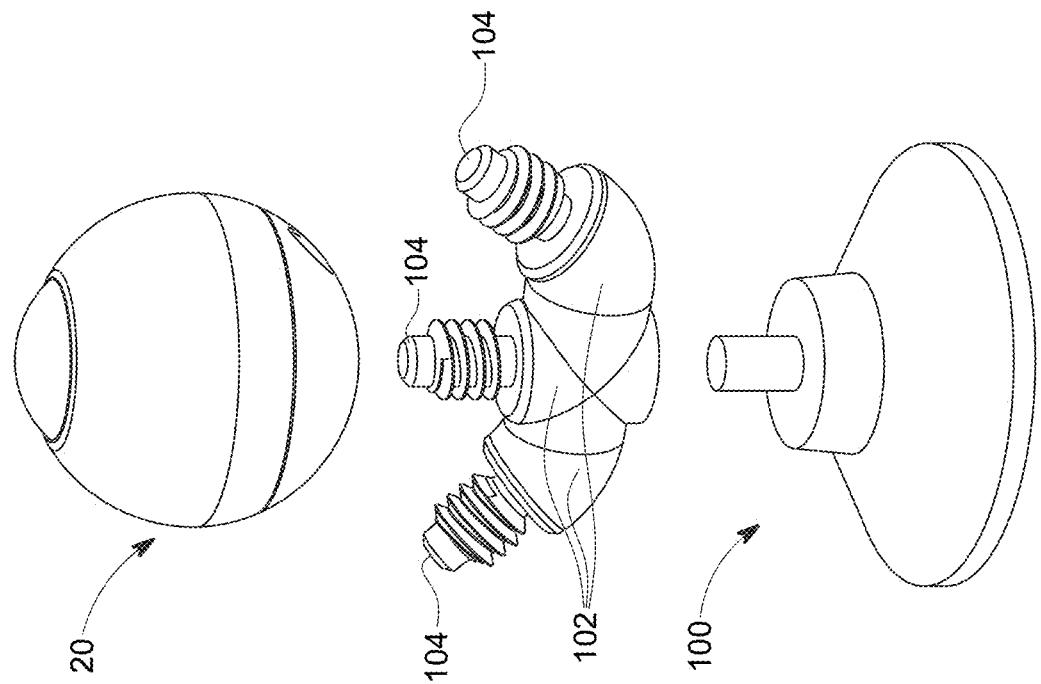
FIGS. 16A-16B are perspective assembled and exploded views of an alternative type of base with three differently angled pedestals having screw-on eye model posts.
Figure 16A:
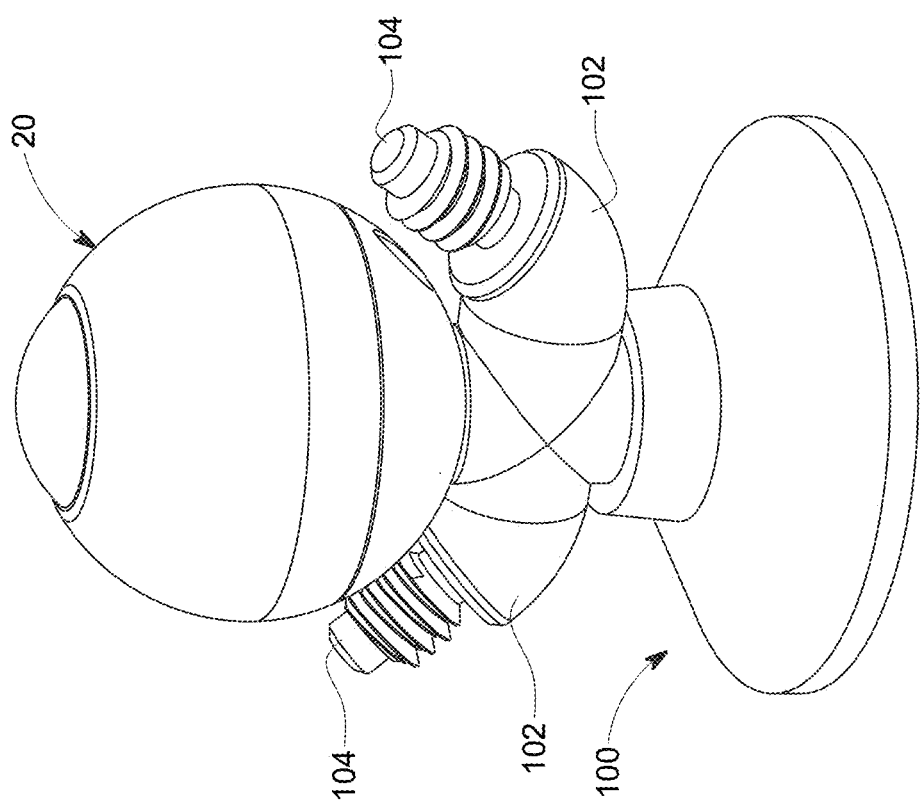

FIGS. 16A-16B are perspective assembled and exploded views of an assembled eye model 20 of the present application on a stable base 100 with three differently angled pedestals 102 having screw-on eye model posts 104. The angled pedestals 102 may be fixedly secured at angles of between 0-45° from the vertical. FIG. 16B shows the eye model 20 exploded from the posts 104. The screw-on connection may be replaced with a snap-on type of connection or a magnetically mounted connection.

Figure 17A:
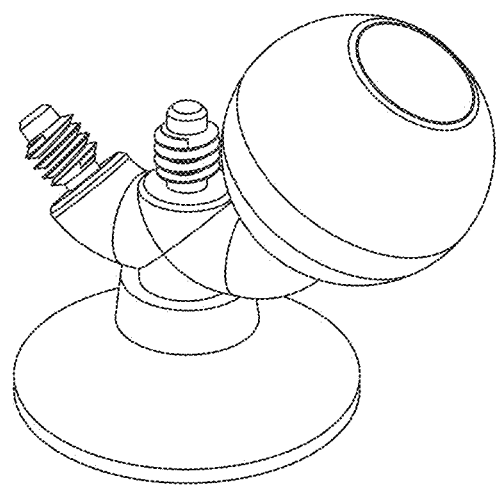
FIGS. 17A-17C are perspective assembled views of the alternative type of base with an eye model mounted to one of three angled posts.
Figure 17B:
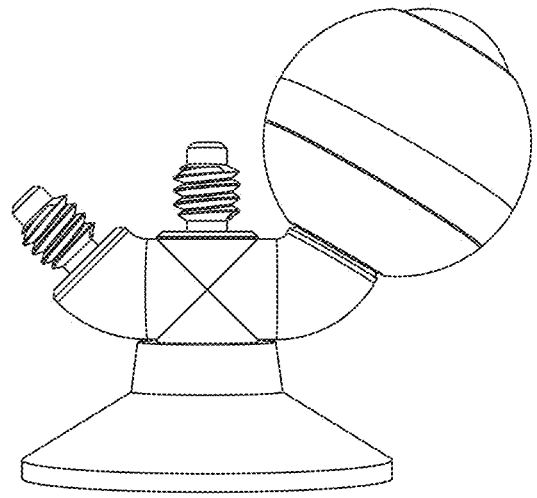
Figure 17C:
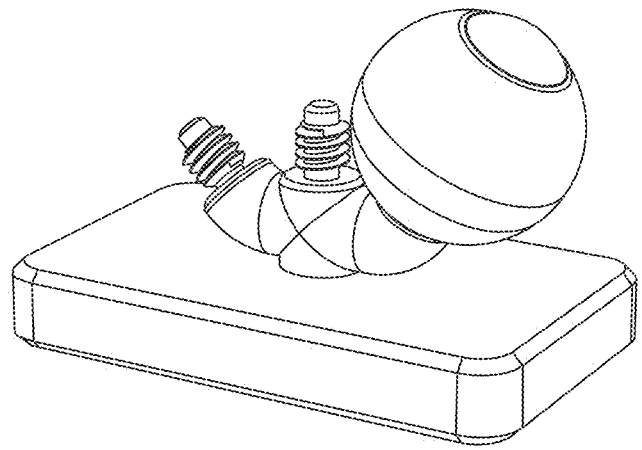

FIGS. 17A-17C are perspective assembled views of the alternative type of base with an eye model mounted to one of three angled posts.

Figure 18:
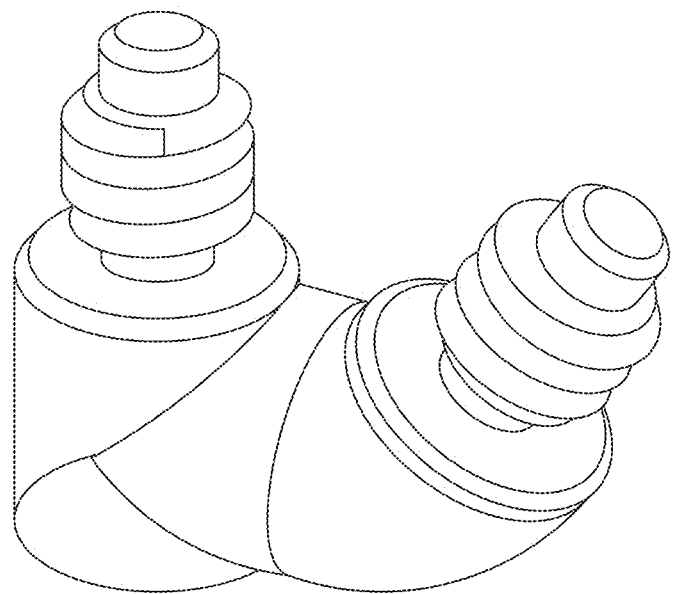
FIG. 18 is a perspective view of another pedestal assembly with two differently angled pedestals.
Figure 19:
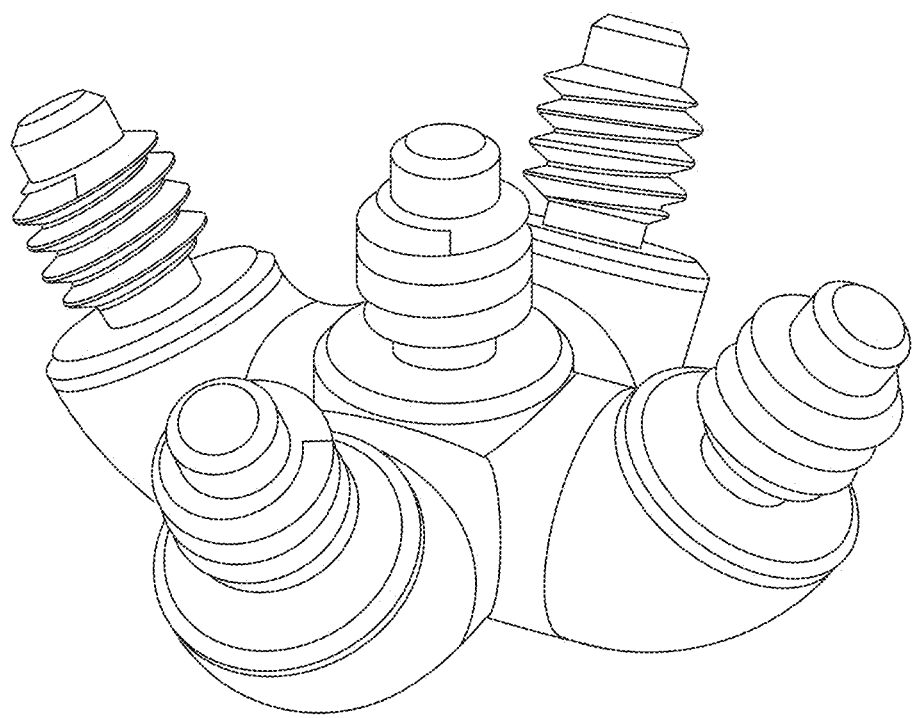
FIG. 19 shows one with 5 angled pedestals.

FIG. 18 is a perspective view of another pedestal assembly with two angled pedestals, and FIG. 19 shows one with 5 angled pedestals.

Figure 20A:
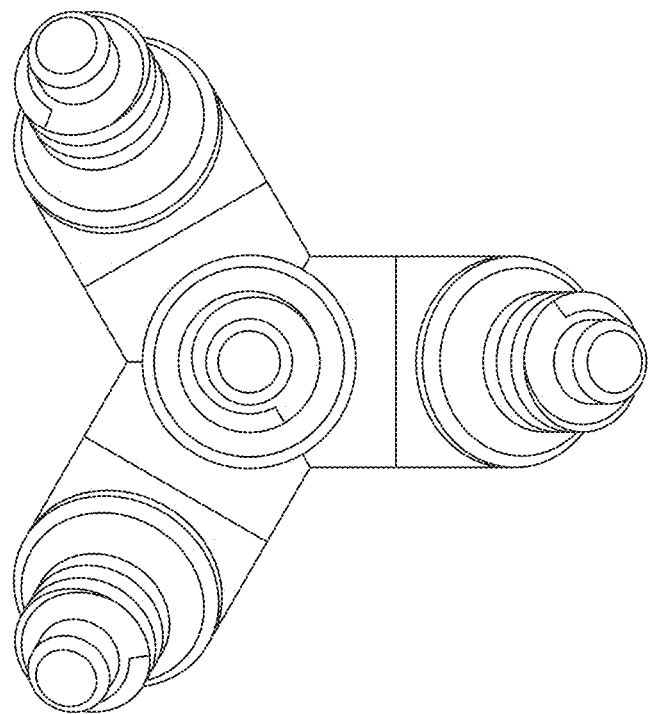
FIGS. 20A-20B are perspective views of still another pedestal assembly with 4 differently angled pedestals.
Figure 20B:
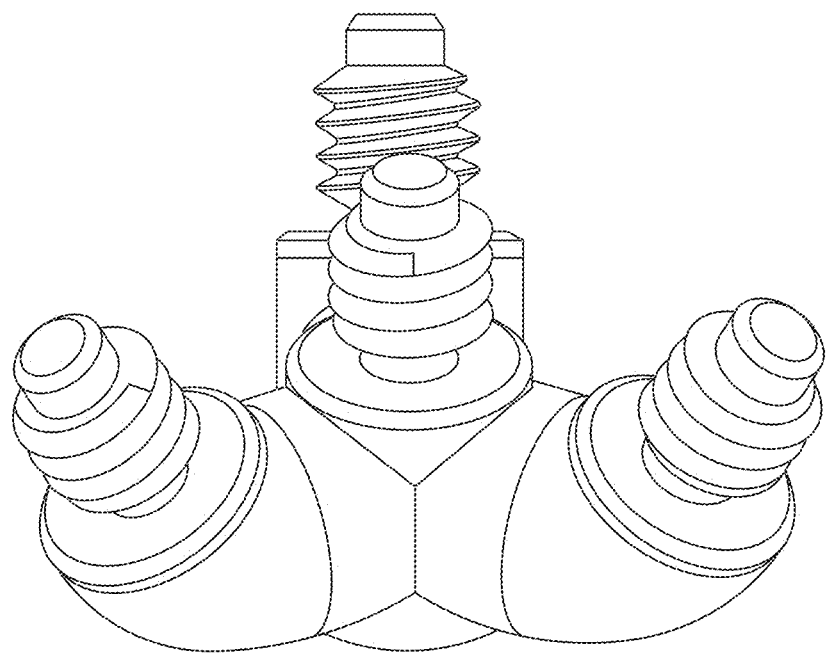

FIGS. 20A-20B are perspective views of still another pedestal assembly with 4 angled pedestals.

Figure 21:
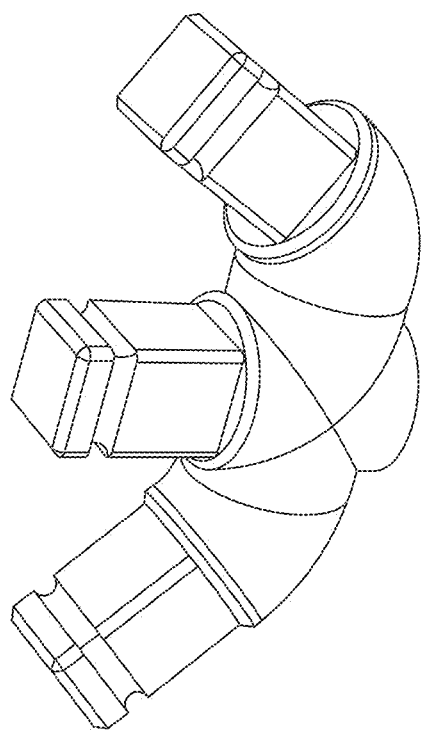
FIG. 21 is a perspective view of a 3-pedestal assembly having snap-on eye model posts.

FIG. 21 is a perspective view of a 3-pedestal assembly having snap-on eye model posts.

Figure 22:
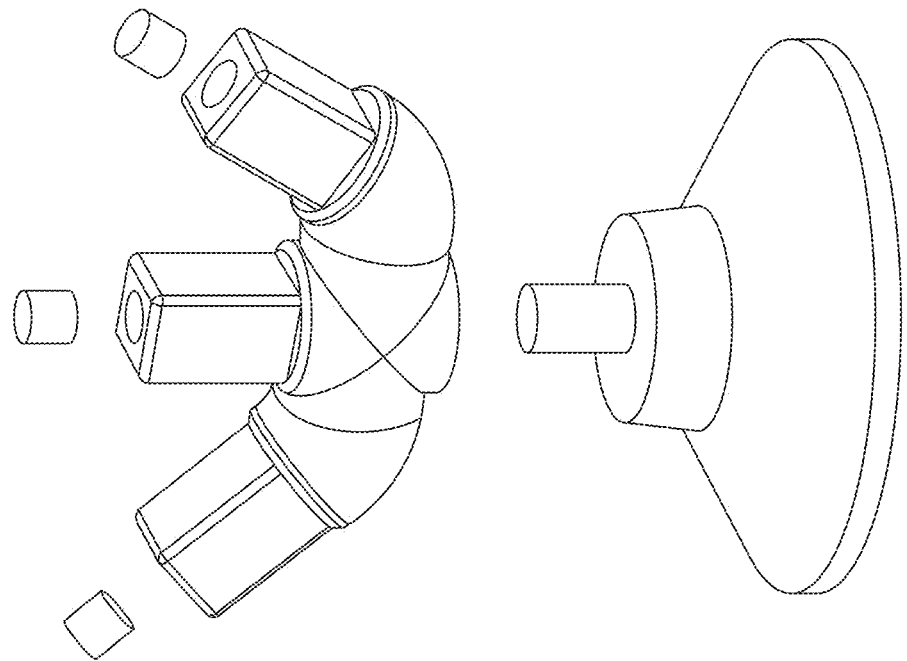
FIG. 22 is a perspective exploded view of a base and 3-pedestal assembly having magnetic type posts.

FIG. 22 is a perspective exploded view of a base and 3-pedestal assembly having magnetic type posts.

Figure 23:
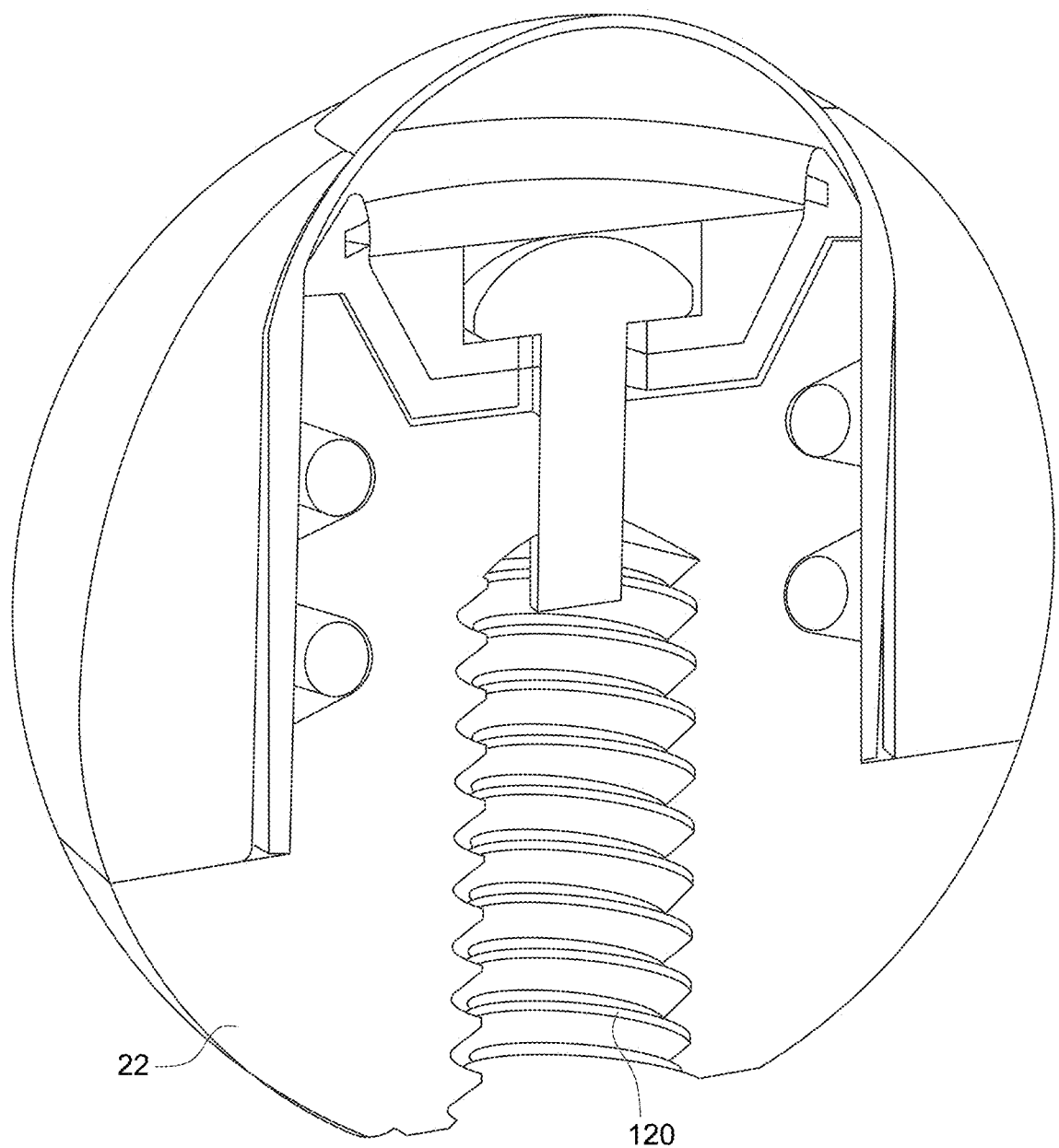
FIG. 23 is a vertical sectional view through an exemplary eye model showing one way for mounting a rigid lower core to a base/pedestal.
Figure 24:
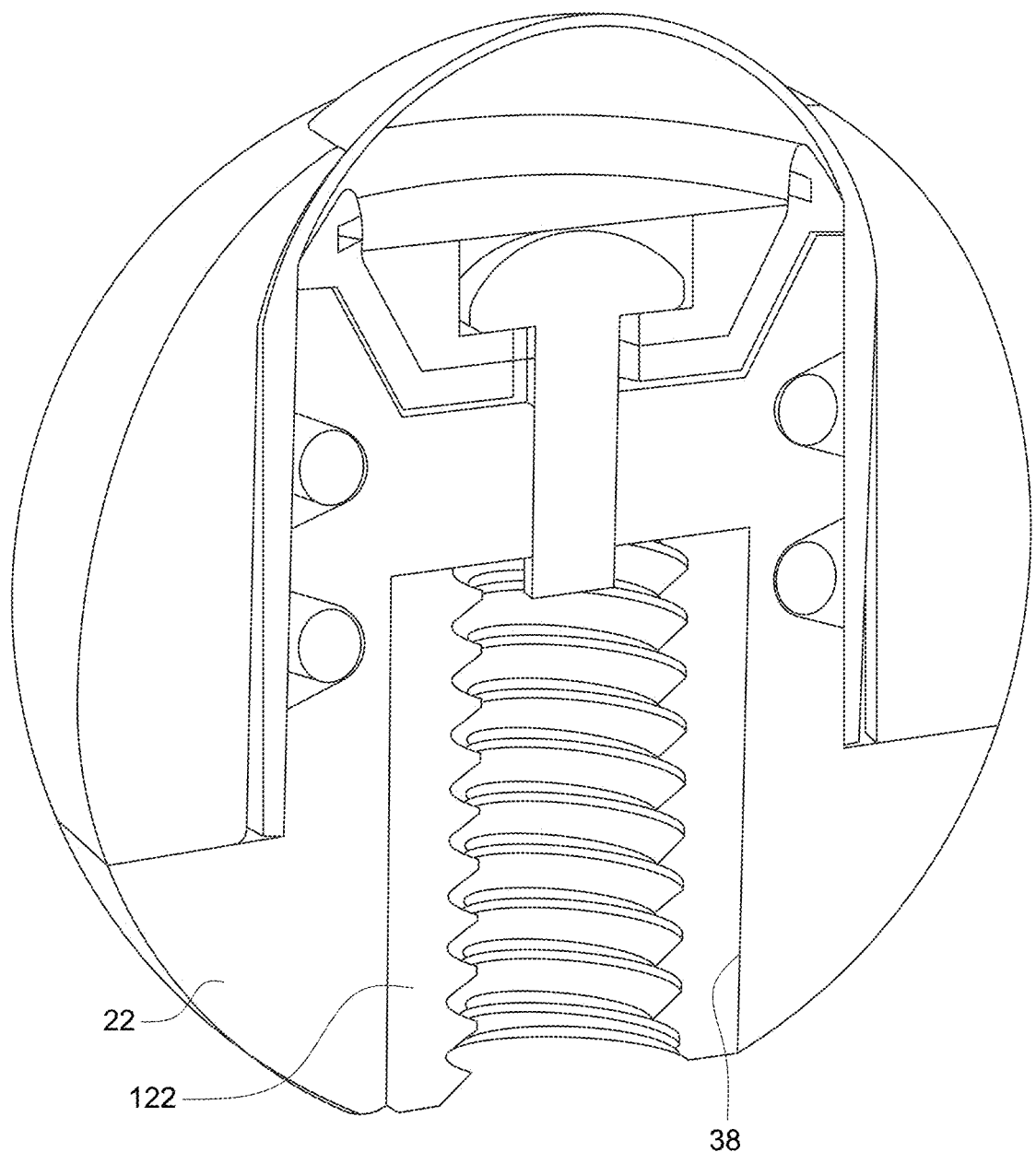
FIG. 24 is a vertical sectional view through an alternative arrangement thereof.

The rigid lower core 22 is desirably molded for ease of manufacture. In one embodiment, inner threads are also molded within a cavity 120 in the core 22, as seen in FIG. 23. The threads mate with external threads on one of the pedestals 102 having threaded posts 104 such as seen in FIGS. 16A-20B. To reduce manufacturing costs, a separate threaded insert 122 may be held via an interference fit or adhesive into a lower recess or cavity 38 of the core 22, as seen in FIG. 24. Depending on the type of attachment—screwed, snapped or magnetically secured—different inserts 122 may be provided to an eye model where the core 22 has the empty cavity 38.

Angled Pedestals

During certain ab interno surgeries on the eye, it is necessary to view the anterior chamber angle (angle surgeries). This chamber angle cannot be seen with ordinary viewing because the light rays are deflected by the cornea.

In order to view this angle, a gonioprism is needed to redirect light rays into the angle.

When using a gonio prism during ab interno surgery, such as a goniotomy, it necessary to rotate the patient's head for proper visualization of the angle through a microscope. The angle that a patient's head is rotated varies from patient to patient, but is typically from 0 to 45 degrees. The angle of the patient's head, and therefore eye, is not only critical for visualization, but also for proper positioning of surgical devices.

It is important for those training for angle surgeries to be able to practice visualization and device positioning with the eye at different angles. The rigid mount presented provides multiple mounting positions (arms or pedestals) for a simulated eye ranging from 0 to 45 degrees. This mount can have one or more pedestals at specific angles. These specific angles give the user the ability to be trained and/or evaluated at specific eye orientations. The mount can attach to different bases such as a suction cup or rigid base, depending on the need.

The rigid mounting pedestals can connect to a simulated eye by methods such as, but not limited to: magnet, snap or screw connection.

Augmented Reality (AR)

Simulated eye surgery can be significantly aided by the use of Augmented Reality (AR). One example of this would be to implement a "smart conjunctiva" that would have special images, pictures, or objects to trigger a pre-defined AR environment. With the use of headsets or smartphone applications, the user can access an AR environment while using a physical eye model to allow significantly more training methods.

Many eye models are used to get a fundamental understanding of the eye and the structures that it contains. AR can overlay anatomical references such as veins, eye quadrants, and muscle groups with expanded information. With AR, it is also possible to do a virtual 3D exploded view to see the relative interaction of structures. An anatomy training mode could also provide quizzes to the user.

Figure 25:
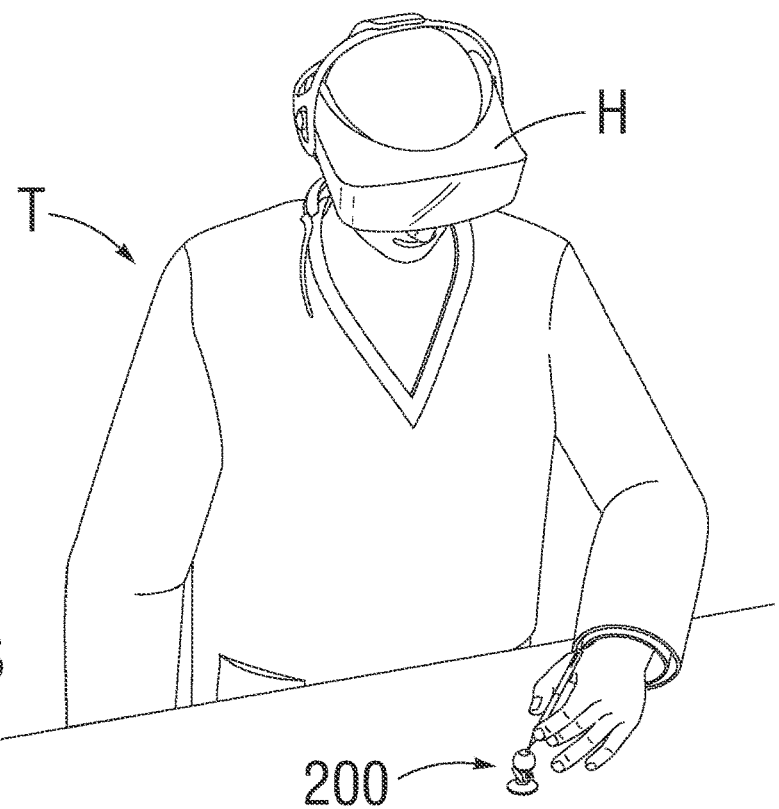
FIGS. 25, 26 and 27 are depictions of a trainee using an augmented reality (AR) headset while performing a simulated procedure on an eye model as described herein.
Figure 26:
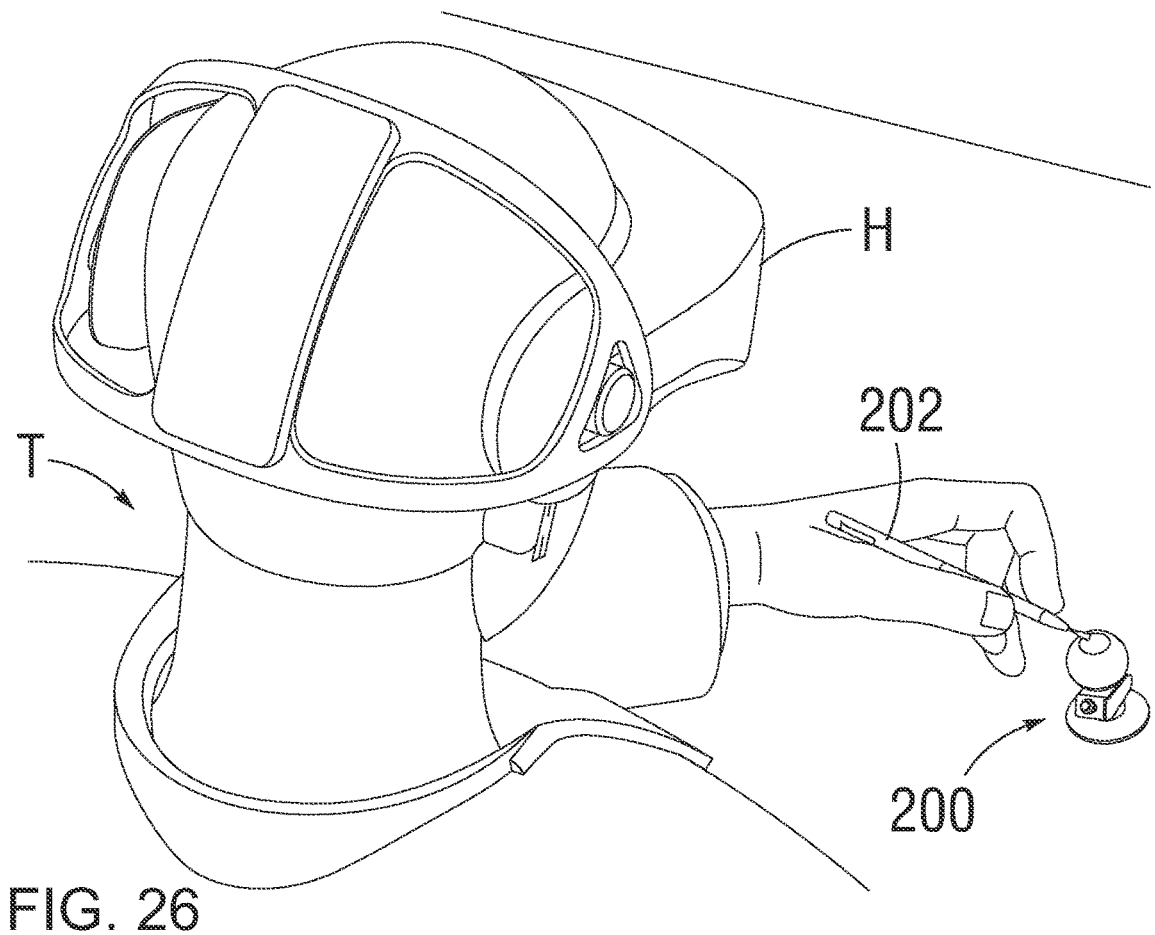
Figure 27:
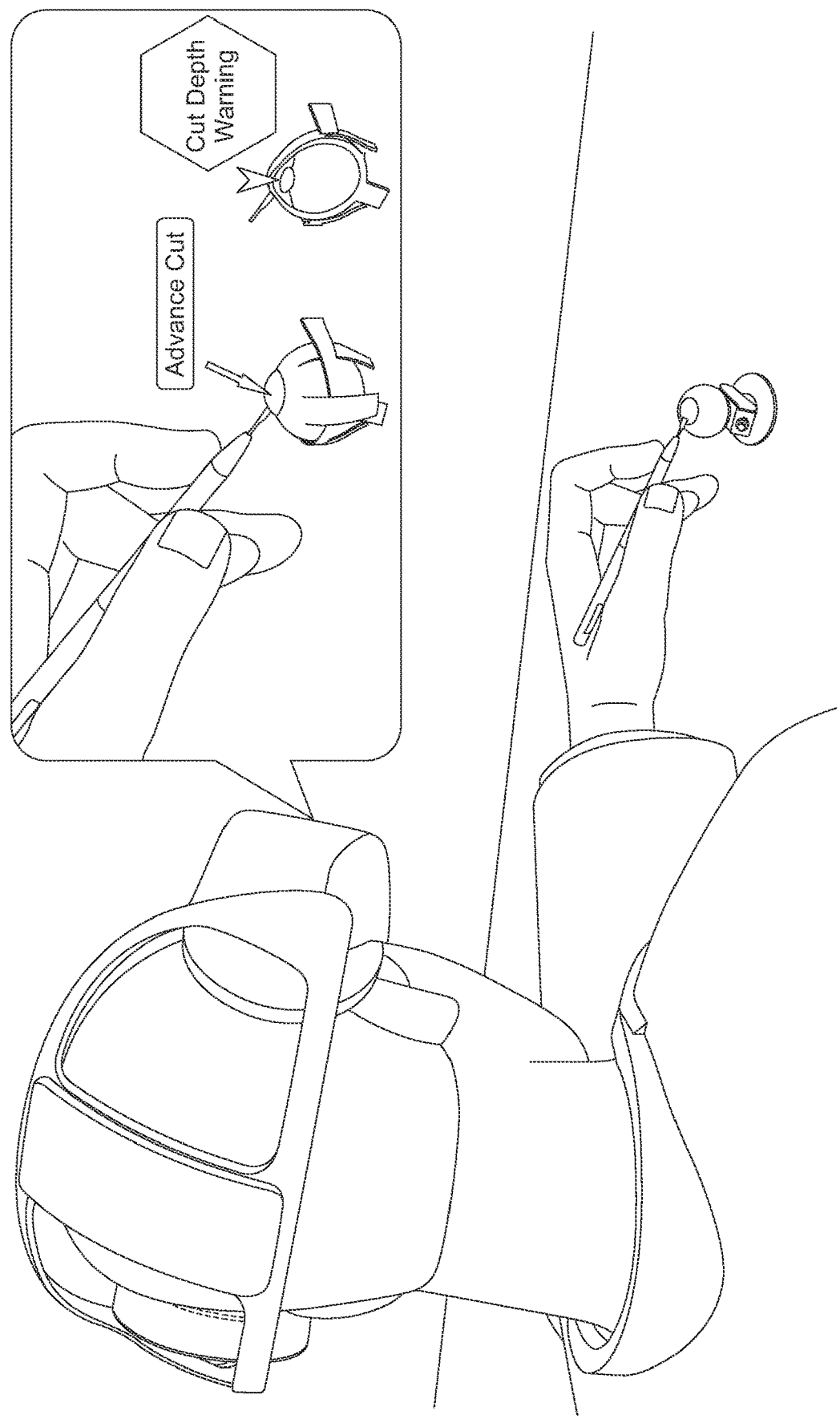

FIGS. 25, 26 and 27 are depictions of a trainee T using an augmented reality (AR) headset H while performing a simulated procedure on an eye model 200, such as any of the models described herein. The eye model 200 may be equipped with various sensors or electronic fiducials (marker nodes) whose precise location are registered with positioning software fed to the headset H. For instance, an augmented reality trigger (e.g., fiducials) may be printed on the conjunctiva surrounding the scleral layer (described above). In this way, the trainee T may be able to manipulate a surgical instrument I to perform the procedure while tracking the instrument relative to features within the eye model 200. The tactile feedback provided by the eye model 200 in conjunction with the detailed visuals input to the three-dimensional viewer within the headset H provides a rich and highly instructive augmented experience for the trainee T. FIG. 27 shows an image of what might be displayed on the headset during use. Additional anatomy such as muscles might be included in the augmented image, and also sectional tissue views for added information. The software may be programmed to prompt user actions. Examples of technical systems for implementing such an augmented training session are disclosed in U.S. Patent Publication No. 2021/0205126 to Puglisi, which is expressly incorporated herein.

AR Surgical Steps

One of the most beneficial uses of AR with a simulated eye would be simulated surgeries. The user could have 3D visualization, animation, and demonstration of surgical steps prior to beginning surgical simulation. Another option would be to have the instruction overlayed as they complete each surgical step. Some examples include displaying the distance from anatomical references (such as the limbus) to make incisions and also recognizing the tools used to ensure correct selection. During a surgical step, warnings could also be displayed, such as structures beneath the surface to avoid. Users will have the chance to practice rare and dangerous scenarios.

This simulation could also give practitioners the ability to rehearse high-pressure and high-risk situations of real-world patients before their surgery begins. Additionally, the simulation could introduce complications in patient anatomy, expanded disease discovery, critical situations such as uncontrolled bleeding, ruptures, and patient vitals becoming unstable. Any mistakes can be learned from without distressing the patient. Training for multiple scenarios would benefit surgical outcomes.

Simulation programs can also be set to certain crisis responses, such as a military medic, where the objective would be quick stabilization and prep for transport.

AR Education Environment

With AR and the connectivity to smart devices, the interaction of human-to-human training can occur virtually. A remote proctor can join live to train and provide lessons to one or more participants. Surgical simulations can also be recorded for later review or scoring from a remote proctor or professional educator as part of a curriculum. Users can also connect with others to advise on surgical rehearsals or collaborate on developing innovative new procedures.

The physical models allow for tactile hands-on training, while the AR overlays reveal more layers of information than the model alone could provide. This fusing of physical and virtual training creates a safe and replicable environment for learning complex surgical skills which traditionally could only be provided via practice on cadavers or live patients.

AR Additional Use Cases

An AR overlay on simulated eyes can also aid those with different roles in the medical field. An example could be overlaying different eye conditions that a nurse practitioner or generalist identifies before referring to a specialist. This can also include practicing patient interactions and eye exams. AR can also outline steps for robotic surgery or equipment such as laser machines and how to properly interface the equipment with the eye.

General Use Scenario for Gonioscopic Surgery

General use scenario for ab interno gonioscopic surgery: To set up for the simulation the pedestal base is placed underneath a microscope and the suction cup holds it in place. The eye model is screwed, snapped or magnetically secured onto the non-free spinning base to hold it in place. The eye in this scenario utilizes a transparent sheet for the TM.

The practicing surgeon will make an incision into the cornea using an ophthalmic knife.

The surgeon will inject viscoelastic into the incision to fill the anterior chamber for visualization and to maintain the space to prevent it from collapsing.

Viscoelastic is placed directly onto the cornea to enhance visualization for the gonioprism.

Gonioprism is then placed onto the cornea.

A microscope is used to view the iridocorneal angle via the gonioprism for the surgical procedure.

The colored Schlemm's canal would be used as an anatomical identifier to perform a surgery that interacts with or manipulates the TM/Schlemm's canal. The clear TM would allow for increased visualization for any fluid or object that passes through the TM/Schlemm's canal.

The preceding steps are shared with all ab interno gonioscopic surgeries.

From here, the surgeon could practice various techniques. For example, the surgeon could proceed to place the implant into the TM for a stent procedure, or inject viscoelastic through the TM and into Schlemm's Canal for a canaloplasty, or use a bent needle/knife to excise TM for a goniotomy. This completes one exemplary simulation.

Example use scenario for an ab externo tube shunt implantation: To set up for the simulation the pedestal base is placed underneath a microscope and the suction cup holds it in place. The eye is screwed, snapped or magnetically secured onto the non-free spinning base to hold it in place.

Viscoelastic is placed directly onto the cornea to enhance visualization for the gonioprism.

Gonioprism is then placed onto the cornea.

A microscope is used to view the iridocorneal angle via the gonioprism for the surgical procedure.

The practicing surgeon will perform the implantation working from the outside of the eye.

A needle is inserted beneath the conjunctiva and into the sclera a few millimeters below the cornea, continuing into Schlemm's canal, and out through the TM.

The needle is then removed creating a tunnel. A drainage tube is then placed through the tunnel. A drainage tube can also be inside of the needle during insertion and released when retracting the needle.

Placement in the anterior chamber is confirmed using gonioscopic visualization, and the stent can be repositioned if the stent is either too short or too long in the anterior chamber.

After visual confirmation, the tube is secured and the conjunctival pocket is sutured closed.

The eye can be reused several times depending on the surgical technique and treatment area. To reuse the eye the surgeon only has to rotate it on the non-free spinning base to access a different quadrant.

After use, the eye model can be disposed of appropriately.

While the invention has been described in its preferred embodiments, it is to be understood that the words which have been used are words of description and not of limitation. Therefore, changes may be made within the appended claims without departing from the true scope of the invention.

What is claimed is:

1. An eye model for ophthalmic training procedures, comprising:
   a lower core made of a rigid material and having an upwardly facing cavity defining an anterior chamber;
   a compressible corneal dome having a hemispherical portion facing upward, the corneal dome mounted over the lower core and spanning the anterior chamber; and
   a compressible scleral dome mounted around the corneal dome and having an upper bore that fits around the hemispherical portion of the corneal dome, the scleral dome including an exterior conjunctiva layer formed at least in part of a thin, flexible polymer.

2. The eye model of claim 1, wherein the conjunctiva layer is transparent.

3. The eye model of claim 1, wherein the conjunctiva layer is semi-transparent or opaque.

4. The eye model of claim 1, wherein the conjunctiva layer is formed of multiple solid layers.

5. The eye model of claim 4, wherein the conjunctiva layer further includes at least one liquid layer interposed between two solid layers.

6. The eye model of claim 1, wherein the upwardly facing cavity is defined by a Canal frame disposed at an upper end of the lower core, and wherein the Canal frame defines a circular upper lip and an inwardly-facing circular Schlemm's canal groove formed in an inner wall of the Canal frame below the upper lip.

7. The eye model of claim 6, further including an annular structure disposed within the Schlemm's canal groove, the annular structure being selected from the group consisting of a tube and semi-solid material.

8. The eye model of claim 6, further including a flexible sheet spanning across the Schlemm's canal groove, wherein an outer portion of the flexible sheet extends outward around the upper lip and an inner portion conforms to a central depression defined by the Canal frame and circumscribed by the upper lip.

9. The eye model of claim 1, further including an iris/pupil graphic visible on an upper surface of the anterior chamber.

10. The eye model of claim 9, wherein the iris/pupil graphic includes a graphical representation of the iris and pupil as well as a circular array of hash marks spaced to simulate hours of a clock face.

11. The eye model of claim 1, further including a base adapted to provide a platform for the eye model and multiple pedestals extending upward from the base at different angles, the base and pedestals being made of a rigid material, and wherein the lower core is configured to attach at the top of any of the pedestals.

12. An eye model for ophthalmic training procedures, comprising:
   a lower core made of a rigid material;
   a compressible corneal dome having a hemispherical portion facing upward, the corneal dome mounted over the lower core; and
   a compressible scleral dome mounted around the corneal dome and having an upper bore that fits around the hemispherical portion of the corneal dome, the scleral dome including an exterior transparent flexible conjunctiva layer covering part or all the scleral dome.

13. The eye model of claim 12, wherein the conjunctiva layer is formed of multiple solid layers.

14. The eye model of claim 12, wherein the conjunctiva layer further includes at least one liquid layer interposed between two solid layers.

15. The eye model of claim 12, wherein the lower core defines an upwardly facing cavity at an upper end thereof, the cavity defining a circular upper lip and an inwardly-facing circular Schlemm's canal groove formed in an inner wall thereof below the upper lip.

16. The eye model of claim 15, further including an annular structure disposed within the Schlemm's canal groove, the annular structure being selected from the group consisting of a tube and semi-solid material.

17. The eye model of claim 15, further including a flexible sheet spanning across the Schlemm's canal groove, wherein an outer portion of the flexible sheet extends outward around the upper lip and an inner portion conforms to a central depression defined by the Canal frame and circumscribed by the upper lip.

18. The eye model of claim 12, further including an iris/pupil graphic visible on an upper surface of the anterior chamber.

19. The eye model of claim 18, wherein the iris/pupil graphic includes a graphical representation of the iris and pupil as well as a circular array of hash marks spaced to simulate hours of a clock face.

20. The eye model of claim 12, further including a base adapted to provide a platform for the eye model and multiple pedestals extending upward from the base at different angles, the base and pedestals being made of a rigid material, and wherein the lower core is configured to attach at the top of any of the pedestals.

* * * * *